United States Patent
Rennich et al.

(10) Patent No.: US 12,463,798 B2
(45) Date of Patent: Nov. 4, 2025

(54) OBTAINING A SESSION USING A DEVICE USER KEY

(71) Applicant: JumpCloud, Inc., Louisville, CO (US)

(72) Inventors: Joel Rennich, West Lakeland, MN (US); Matthew Slocum, Broomfield, CO (US); Charles Pinkerton, III, Boulder, CO (US)

(73) Assignee: JumpCloud, Inc., Louisville, CO (US)

( * ) Notice: Subject to any disclaimer, the term of this patent is extended or adjusted under 35 U.S.C. 154(b) by 52 days.

(21) Appl. No.: 18/545,917

(22) Filed: Dec. 19, 2023

(65) Prior Publication Data
US 2025/0070958 A1   Feb. 27, 2025

Related U.S. Application Data

(60) Provisional application No. 63/578,620, filed on Aug. 24, 2023.

(51) Int. Cl.
*H04L 9/08* (2006.01)
*H04L 9/32* (2006.01)

(52) U.S. Cl.
CPC .......... *H04L 9/0816* (2013.01); *H04L 9/0866* (2013.01); *H04L 9/3213* (2013.01); *H04L 9/3236* (2013.01); *H04L 9/3247* (2013.01); *H04L 9/3263* (2013.01); *H04L 9/3271* (2013.01)

(58) Field of Classification Search
CPC ... H04L 9/0816; H04L 9/0866; H04L 9/3213; H04L 9/3236; H04L 9/3247; H04L 9/3263; H04L 9/3271
See application file for complete search history.

(56) References Cited

U.S. PATENT DOCUMENTS

| | | | | |
|---|---|---|---|---|
| 9,462,044 | B1 * | 10/2016 | Preibisch | H04L 63/0823 |
| 10,057,243 | B1 * | 8/2018 | Kumar | H04L 9/0891 |
| 11,121,873 | B2 * | 9/2021 | Schmaltz | H04L 9/3242 |
| 12,224,991 | B1 * | 2/2025 | Joglekar | H04L 63/0478 |
| 2012/0179907 | A1 * | 7/2012 | Byrd | H04L 9/3268 |
| | | | | 713/156 |

(Continued)

FOREIGN PATENT DOCUMENTS

| | | |
|---|---|---|
| EP | 2254304 A2 | 11/2010 |
| WO | 2022/140469 A1 | 6/2022 |

OTHER PUBLICATIONS

"Partial International Search Report & Invitation to Pay Additional Fees," issued in connection with Int'l Appl. No. PCT/US2024/038876, dated Oct. 21, 2024 (10 pages).

*Primary Examiner* — Darren B Schwartz
(74) *Attorney, Agent, or Firm* — Holland & Hart LLP

(57) ABSTRACT

Mechanisms for resource management are described. A trust anchor for a device may be obtained. A trust anchor for a user may be obtained. A public key of the device that corresponds to a private key stored in a cryptographic component internal to the device may be generated. The public key of the device may be registered, with a service operated by a resource management system, to a combination of the device and user. Registering the public key of the device may include sending, to the service operated by the resource management system, a registration message that indicates the trust anchor for the device, the trust anchor for the user, and the public key of the device.

21 Claims, 12 Drawing Sheets

(56) References Cited

U.S. PATENT DOCUMENTS

| | | | |
|---|---|---|---|
| 2013/0191884 A1* | 7/2013 | Leicher | H04L 63/08 |
| | | | 726/4 |
| 2013/0215455 A1* | 8/2013 | Armstrong | G06F 21/608 |
| | | | 358/1.15 |
| 2013/0339740 A1 | 12/2013 | Ben-Shalom et al. | |
| 2016/0014119 A1* | 1/2016 | Inoue | H04L 63/0853 |
| | | | 726/9 |
| 2016/0080383 A1* | 3/2016 | Hockings | H04L 9/0894 |
| | | | 726/9 |
| 2016/0259936 A1* | 9/2016 | Mukherjee | H04L 63/061 |
| 2017/0142108 A1* | 5/2017 | Zhang | H04L 63/0807 |
| 2017/0195457 A1* | 7/2017 | Smith, II | H04L 63/10 |
| 2018/0332016 A1* | 11/2018 | Pandey | H04L 63/0428 |
| 2019/0394041 A1* | 12/2019 | Jain | H04L 9/0891 |
| 2020/0013050 A1* | 1/2020 | Finlow-Bates | H04L 9/3239 |
| 2020/0065464 A1* | 2/2020 | Dharmarajan | G06F 21/33 |
| 2021/0083873 A1* | 3/2021 | Harris | H04L 9/3297 |
| 2021/0136078 A1* | 5/2021 | Barhudarian | H04L 63/08 |
| 2021/0288808 A1* | 9/2021 | Bahety | H04L 9/3247 |
| 2021/0377248 A1* | 12/2021 | Brainer | H04L 63/083 |

\* cited by examiner

620

OBTAINING A SESSION USING A DEVICE USER KEY

CROSS REFERENCE

The present Application for Patent claims the benefit of U.S. Provisional Patent Application No. 63/578,620 by RENNICH et al., entitled "OBTAINING A SESSION USING A DEVICE USER KEY," filed Aug. 24, 2023, assigned to the assignee hereof, and expressly incorporated by reference herein.

TECHNICAL FIELD

The present disclosure relates generally to resource management, including techniques for registering and utilizing a device user key.

BACKGROUND

An organization (e.g., a company, enterprise, etc.) may manage, operate, and/or have access to numerous remote and local servers as part of its information technology (IT) system. The servers in the IT system may be used for hosting, storing, and distributing software applications, business documents, entertainment files (e.g., audio and video files), webpages, and the like. The servers in the IT system may located on premises, located off premises (e.g., within remote data centers), hosted by a third-party (e.g., in "the cloud"). The organization may also manage, operate, and/or have access to numerous remote and local devices as part of its IT system. The devices (e.g., computers, phones, tablets, printers, etc.) in the IT system may be used to run applications, access aspects of the IT system, and serve other productivity functions. As new devices and servers are brought online and old devices and servers are decommissioned, IT systems tend to be constantly changing, and, as a result, managing IT systems may be time consuming, labor intensive, and tedious.

Resource management systems may facilitate the management of, operation of, and access to a wide variety of system resources (including local servers, remote servers, cloud-based servers, etc.) in an IT system. Resource management systems may also facilitate the management of, operation of, and access to user resources, including physical user devices (e.g., laptops, desktops, phones, tablets, etc.) and virtual user devices (e.g., virtual machines). User resources may be under the control of a user that is in possession of the user resource. In some examples, a user resource may be owned by the user, and software associated with the organization (e.g., mobile device management (MDM) software) may be used to manage operations aspects of the user resource. Accordingly, user resources may be scattered throughout a geographic environment. For example, certain user resources may be located within an internal IT network, while other user resources may be located outside an internal IT network. Also, positions of user resources may be constantly (relative to system resources) changing. For example, certain user resources may constantly (e.g., on a daily basis) join and leave an internal IT network. In some examples, user resources that are outside an internal IT network may gain access to the internal IT network using a virtual public network service.

Managing and supporting the operation of user resources may include installing software on user resources, setting system-level configurations (e.g., password requirements, default permissions, etc.) for user resources, controlling access of users to particular software and user services, controlling access of users to user resources, internal resources, third-party software and third-party services, and the like. Centralized and consistent application of IT policy across system resources, user resources, and users is imperative to achieving an IT system that functions efficiently and predictably.

DETAILED DESCRIPTION

Relying solely on a certificate that uniquely identifies a device (e.g., a device certificate, mobile device management (MDM) certificate, etc.) to provide a device access to a service may be agnostic to a user of the device. Similarly, relying solely on an ID token certificate to provide a user access to a service may be agnostic to the device. That is, individually, neither the device certificate nor the ID token may identify a unique device/user combination. Moreover, relying on just one of a device certification or an ID token for authorizing initial and continued access may leave a device or user vulnerable to fraudulent acts (e.g., phishing schemes, man-in-the-middle attacks, etc.) as these pieces of information are communicated across internal and external networks. Thus, mechanisms that support providing initial and continued access to services based on unique device/user combinations while increasing security may be desired.

To support providing initial and continued access to services based on unique device/user combinations while increasing security, a trust anchor of a device (e.g., a device certificate, an MDM certificate, etc.), a trust anchor for a user (e.g., an ID token) stored at the device, and a public/ private key pair (which may be referred to as a device key pair) generated at the device may be used to register a unique identifier of the device and user (which may also be referred to as a unique device/user identifier) at an RMS. The RMS may use the unique device/user identifier to support the initial and continued access of a device/user combination to services.

Figure 1:
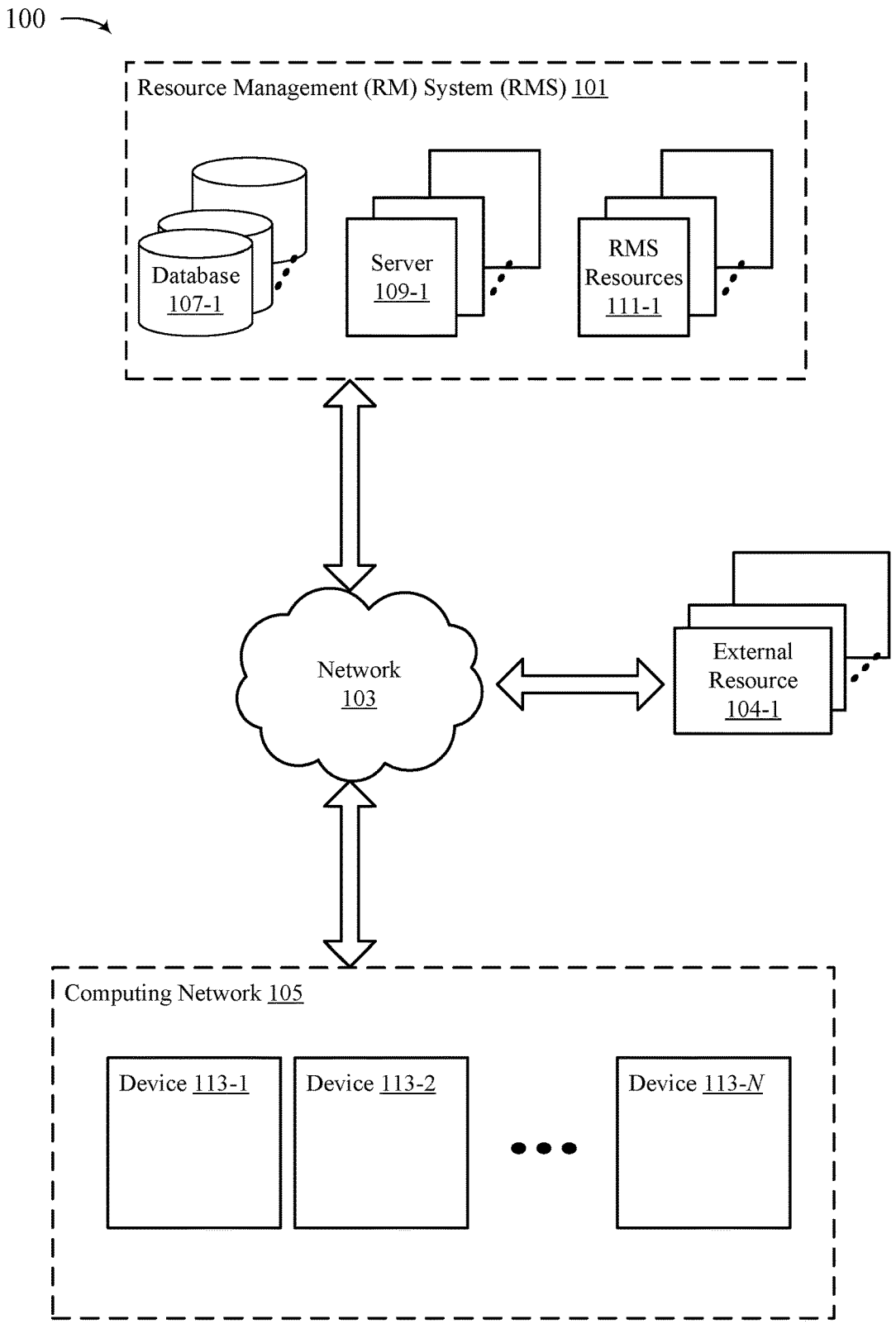
FIG. 1 shows an example of a computing environment that supports registering and utilizing a device user key in accordance with examples disclosed herein.

FIG. 1 shows an example of a computing environment that supports registering and utilizing a device user key in accordance with examples disclosed herein.

The computing environment 100 may include a resource management system (RMS), such as the RMS 101, the network 103, one or more external, third-party resources (e.g., the first external resource 104-1), and one or more computing networks (e.g., the computing network 105).

The RMS 101 may be configured to manage and support the operation of the computing network 105. For example, the RMS 101 may be configured to implement an information technology (IT) policy across one or more resources (e.g., the devices 113) within the computing network 105. The RMS 101 may also be configured to implement and apply IT policy for users of the computing network 105—e.g., the RMS 101 may govern access of users to particular resources, to particular information (e.g., network drives, folders, files, etc.), particular resources (e.g., internal resources, external resources, internal services, external services, etc.), and the like. In some examples, the RMS 101 may provide a centralized location for adding, modifying, or deleting resources, resource configurations, resource permissions, users, user information, user permissions, and the like. In some examples, the RMS 101 may be configured to store resource and user information, such as resource identity, an Internet Protocol (IP) address of a resource, authentication information of a user, a personal information of a user, and the like.

The RMS 101 may include one or more databases (e.g., the first database 107-1), one or more servers (e.g., the server 109-1), one or more RMS resources (e.g., the first RMS resource 111-1), or any combination thereof, which may be used to support (e.g., implement, provide storage for, etc.) the services offered by the RMS 101. The one or more RMS resources may be implemented as physical machines, containers, or virtual machines. In some examples, the one or more databases are implemented using one or more servers, one or more RMS resources, or a combination thereof.

The network 103 may include both private, public, and shared networking infrastructure. For example, the network 103 may include portions of networking infrastructure included within the computing network 105, portions of networking infrastructure included within the RMS 101, or both. Also, the network 103 may include network infrastructure external to both the RMS 101 and the computing network 105 that may be operated by external operators (e.g., Internet service providers (ISPs), cellular providers, satellite providers, etc.) and is used to connect resources together (e.g., digital subscriber line (DSL) networks, cable networks, fiber optic networks, cellular networks, satellite networks, etc.).

The computing network 105 may include one or more resources (e.g., the first device 113-1 through the Nth device 113-N) as well as networking infrastructure to connect the one or more resources to one another, to external networks, and the like. The devices 113 may include system-level devices (e.g., servers, databases, etc.) and user devices (e.g., laptops, desktops, phones, tablets, virtual machines, etc.). In some examples, the system-level devices of the computing network may be located on a premises of, or otherwise under the control of, an operator of the computing network 105. The user devices may be on-premises, off-premises, or may transition between being on and off-premises. For example, a laptop may be brought on premises during business hours and taken off premises outside of business hours. In another example, a laptop may be located primarily off-premises (e.g., if used for remote work). The system-level and user devices may be physical machines or virtual machines.

The external resources (e.g., the first external resource 104-1) may include virtual machines, websites, databases, file servers, web-based applications, web-based services, web-based computing resources, and the like. For example, the external resources may include Salesforce, Microsoft 365, Google Drive, Zoom, Microsoft Azure, and the like. In some examples, the external resources may be implemented using infrastructure that is separate from the infrastructure of the RMS 101, the infrastructure of the computing network 105, or both. In some examples, the infrastructure used to implement the external resources is managed by a different party than the party that controls the RMS 101. In some examples, the infrastructure used to implement the external resources is managed by a different party than the party that controls the computing network 105.

In some examples, the RMS 101 is configured to provide a single sign-on functionality that enables a user to access permitted information and services after an initial authentication of the user is performed (e.g., as part of a logon to a device, as part of a logon to a service managed by the RMS 101, etc.). Additionally, or alternatively, the RMS 101 may be configured to maintain access of the user (e.g., by issuing a token) to an accessed service for a duration of time (e.g., which may be subject to a refresh policy), enabling a user to leave and return to the service without reauthenticating.

As noted herein, the RMS 101 may be configured to manage devices within the computing network 105. For example, the RMS 101 may be configured to manage user devices within the computing network 105—e.g., set login policies, set access policies for the device to resources within the computing network 105, etc. As part of managing devices, the RMS 101 may enroll a device at the RMS 101 (e.g., via an agent of the RMS 101 that is installed on the device). Based on enrolling the device, the RMS 101 may issue, to the agent of the RMS 101, a certificate that uniquely identifies the device (which may be referred to as a "device certificate"). In other examples, as part of managing user devices, the RMS 101 may implement a mobile device management (MDM) policy at a user device. As part of implementing an MDM policy for a specific user device (e.g., the first device 113-1), the RMS 101 may generate an MDM certificate at the user device that uniquely identifies the user device to the RMS 101 and that may be used to vouch for the identity of the device. Accordingly, when interacting with and implementing policy at the user device, the RMS 101 may confirm, using the MDM certificate stored at the user device and related information stored at the RMS 101, the identity of the user device—e.g., to confirm that the user device is indeed the expected device while implementing policy for the user device. In some examples, the RMS 101 may consider the MDM certificate to be a "trust anchor" or "device trust anchor" for the user device. That is, the MDM certificate may be considered a reliable factor for verifying that the user device is the device that the user device purports to be.

The RMS 101 may be configured to manage users associated with the computing network 105. For example, the RMS 101 may be configured to authorize users for access to certain devices, certain services, certain information, and the like. In some examples, the RMS 101 may be configured to authorize a user to access a particular user device (e.g., the first device 113-1). As part of authorizing a user to access the user device, the RMS 101 may support a flow (e.g., an OpenID flow) for verifying the identity of the user and may return an identity (ID) token that identifies the user and that may be used to vouch for the identity of the user. Accordingly, when interacting with and implementing policy for the user, the RMS 101 may confirm, using the ID token stored at the user device, the identify of the user of the device— e.g., to confirm that the user is indeed the user that the user purports to be. In some examples, the RMS 101 may consider the ID token to be a "trust anchor" or a "user trust anchor" for the user.

In some examples, the RMS 101 may use a certificate that uniquely identifies a device (e.g., a device certificate, an MDM certificate) to authorize a device for initial and continued (e.g., persisted) access to a service. In some examples, the RMS 101 may use an ID token to authorize a user for initial and continued access to a service.

However, relying solely on a certificate that uniquely identifies a device (e.g., a device certificate, mobile device management (MDM) certificate, etc.) to provide a device access to a service may be agnostic to a user of the device. Similarly, relying solely on an ID token certificate to provide a user access to a service may be agnostic to the device. That is, individually, neither the device certificate nor the ID token may identify a unique device/user combination. Moreover, relying on just one of a device certification or an ID token for authorizing initial and continued access may leave a device or user vulnerable to fraudulent acts (e.g., phishing schemes, man-in-the-middle attacks, etc.) as these pieces of information are communicated across internal and external networks. Thus, mechanisms (e.g., methods, systems, apparatuses, techniques, configurations, components) that support providing initial and continued access to services based on unique device/user combinations while increasing security may be desired.

To support providing initial and continued access to services based on unique device/user combinations while increasing security, a trust anchor of a device (e.g., a device certificate, an MDM certificate, etc.), a trust anchor for a user (e.g., an ID token) stored at the device, and a public/private key pair (which may be referred to as a device key pair) generated at the device may be used to register a unique identifier of the device and user (which may also be referred to as a unique device/user identifier) at an RMS. The RMS may use the unique device/user identifier to support the initial and continued access of a device/user combination to services.

In some examples, the first device 113-1 may register, at the RMS 101, a unique device/user identifier to a particular device/user combination. To register a unique device/user identifier, the first device 113-1 may obtain a trust anchor for the device (which may be referred to as a device trust anchor)—e.g., a device certificate, an MDM certificate. The first device 113-1 may also obtain a trust anchor for the user (which may be referred to as a user trust anchor)—e.g., an ID token obtained in an Open ID flow, a biometric, etc. And the first device 113-1 may generate a device public/private key pair. In some examples, the first device 113-1 may trigger a hardware-based cryptographic component that is permanently or semi-permanently fixed (e.g., soldered) to the first device 113-1 and may not be used at a different device (e.g., is non-portable) to generate the device key pair, which may be stored in the cryptographic component.

Based on generating the device key pair, the cryptographic component may further generate a unique identifier (which may be referred to as a device key identifier) of the device key pair. The device key identifier be used to by the cryptographic component to identify and access the device key pair when needed. After obtaining the device trust anchor, the user trust anchor, and the device key pair, the first device 113-1 may send, to the RMS 101, a registration message that includes the device trust anchor, the user trust anchor, and the public key of the device key pair (which may be referred to as the device public key). In some examples, first device 113-1 includes the device public key and the user trust anchor in the payload of the registration message and signs the registration message with the device trust anchor.

The RMS 101 (which may be in possession of the device trust anchor and the user trust anchor) may use the device trust anchor and the user trust anchor to verify and validate the registration message. In some examples, the RMS 101 may be in possession of the device trust anchor and the user trust anchor based on itself generating and issuing the underlying information After verifying and validating the registration message, the RMS 101 may register the device public key to the device/user combination that corresponds to the device trust anchor and the user trust anchor. Registering the device public key to the device/user combination may include storing the device public key and an association between the device public key and the device/user combination in the first database 107-1. Thus, the device public key may be used to identify a unique device/user pair for future operations (e.g., future authentication operations). Based on being registered to a specific device/user combination, the device public key may be referred to as a device user key (DUK). In some examples, after successfully registering the DUK to the device/user combination, the RMS 101 may generate a single-use token that identifies the device/user combination, which may be referred to as a device user refresh token (DURT). The RMS 101 may generate and store a key identifier (which may be referred to as a DURT key identifier) for the DURT and may send the DURT to the first device 113-1.

In some examples, a DUK that is registered at the RMS 101 for a particular device/user combination and the DURT may be used together to provide a user initial and continued access to the first external resource 104-1. In some examples, a user of the first device 113-1 may request (e.g., via a browser at the first device 113-1) access to the first external resource 104-1. Based on requesting access to the first external resource 104-1, the first device 113-1 may be redirected, by the first external resource 104-1, to the RMS 101. Based on being redirected to the first external resource 104-1, the first device 113-1 may send a request (which may be referred to as an access request) to gain access to the first external resource 104-1. The first device 113-1 may include the DURT and the DURT key identifier in the access request and may sign the access request with the device private key.

The RMS 101 may use the DURT, the DURT key identifier, and the device public key to validate the access request. Upon successful validation, the RMS 101 may return a device user session token (DUST). Based on receiving the DUST, the first device 113-1 may send the DUST to another service at the RMS 101, which may validate the DUST. After validating the DUST, the other service at the RMS 101 may authorize the user to access the first external resource 104-1 (e.g., by sending a security assertion markup language (SAML) message to the first external resource 104-1), and the first external resource 104-1 may grant the user access.

Although discussed in the context of accessing an external resource, the above techniques may similarly be performed to gain access to a service that is internal to the computing network 205.

By generating, at a device, a unique device key pair for a user and registering (using device and user trust anchors) the device public key to the device/user at an external resource, a device public key that is generated at (and non-portable from) a device may be used to securely and uniquely identify a device/user combination. Based on registering the device public key to the unique device/user combination, a device private key that is stored at (and known only to) the device may be used to authorize the device for subsequent access to services—e.g., based on using the device private key to obtain a refresh token, session token, or both.

Figure 2:
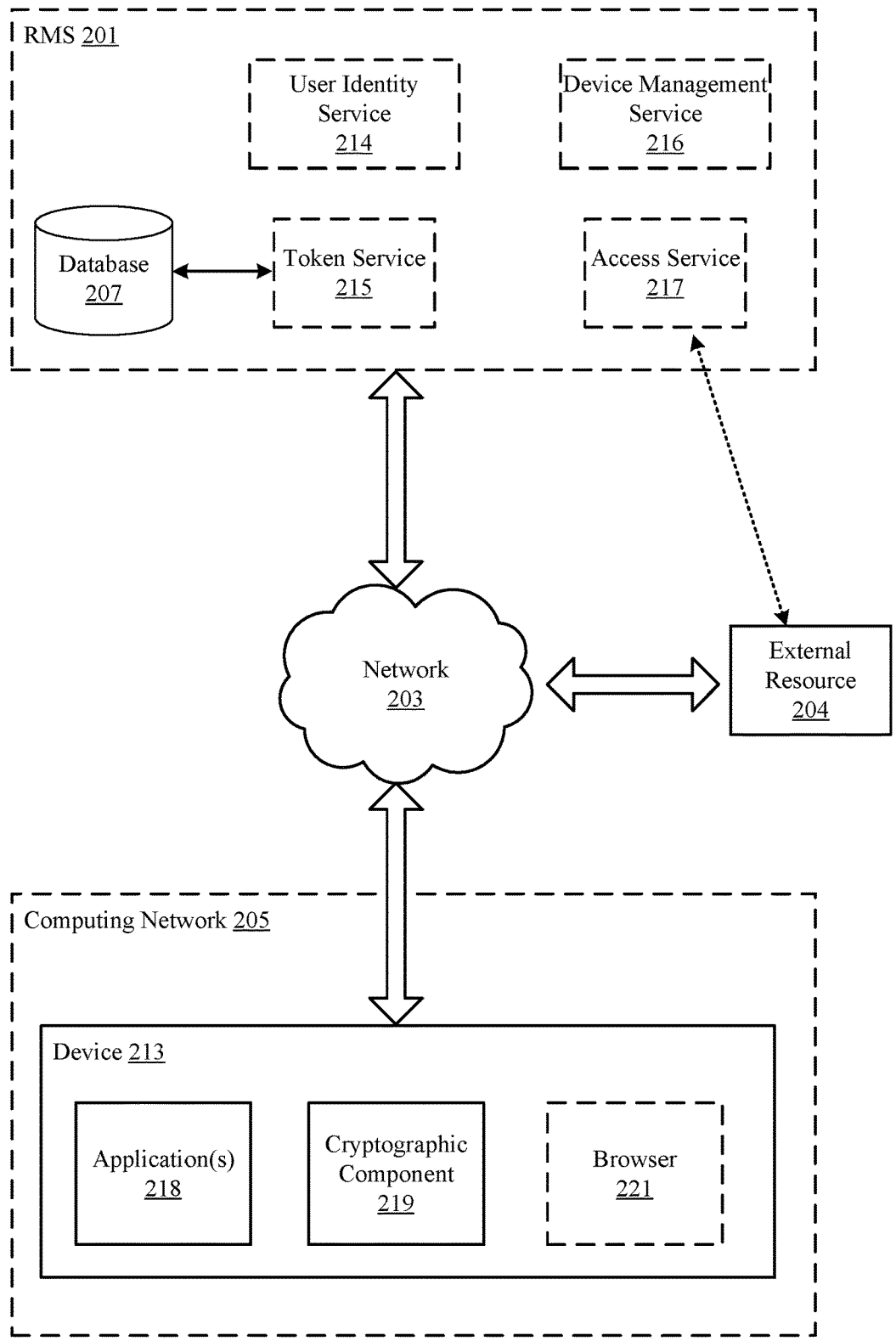
FIG. 2 shows an example of a subsystem that supports registering and utilizing a device user key in accordance with examples disclosed herein.

FIG. 2 shows an example of a subsystem that supports registering and utilizing a device user key in accordance with examples disclosed herein.

The subsystem 200 may include the RMS 201, the network 203, the external resource 204, and the computing network 205, which may be respective examples of an RMS (e.g., the RMS 101 of FIG. 1) a network (e.g., the network 103 of FIG. 1), an external resource (e.g., the first external resource 104-1 of FIG. 1), and a computing network (e.g., the computing network 105 of FIG. 1) described herein.

The RMS 201 may include the database 207, which may be an example of a database (e.g., the first database 107-1 of FIG. 1) described herein. The RMS 201 may also include the user identity service 214, the token service 215, the device management service 216, and the access service 217.

The user identity service 214 may be configured to store and verify identities of users (which may include personal information, authentication information, location information, etc.). The user identity service 214 may be configured to participate in an OpenID flow and may issue an identity token that uniquely identifies a user after the user is verified.

The device management service 216 may be configured to store and verify identities of devices (which may include device type information, location information, etc.). In some examples, the device management service 216 may also be configured to store configurations for particular devices (e.g., in accordance with a mobile device management policy) and may be further configured to implement configurations at particular devices. In some examples, the device management service 216 may be configured to issue a certificate that uniquely identifies a device based on completing an enrollment process for a device via an agent of the RMS 201 that is installed on the device.

The token service 215 may be configured to execute the operations for registering device public keys to unique device/user combinations. The token service 215 may be further configured to execute the operations for generating and delivering tokens (e.g., refresh tokens and session tokens) that support providing a user access to services, such as the external resource 204. For example, at a first time, the token service 215 may be configured to generate a DURT based on a DUK that is stored at the database 207 and registered to the device 213 (which may be an example of a device described herein (e.g., the first device 113-1 of FIG. 1) and a current user of the device 213. The token service 215 may be further configured to deliver the DURT to the device 213. Also, at a subsequent time associated with a request to access the external resource 204, the token service 215 may be configured to generate a DUST based on receiving the DURT from the device 213. The token service 215 may be further configured to deliver the DUST to the device 213.

The database 207 may configured to store device public keys that have been registered to a device/user combination as DUKs. The database 207 may configured to store associations (e.g., mappings, links, etc.) between the stored DUKs and the device/user combinations.

The access service 217 may be configured to provide a user access to services, such as the external resource 204. The access service 217 may be configured to authorize a user of a device (e.g., the device 213) to access a service (e.g., the external resource 204) based on a token (e.g., a session token) that was previously obtained at the device 213 from the token service 215. In some examples, the access service 217 is configured to implement a portal that enables a user to access aspects (e.g., a GUI, a user portal, etc.) of the RMS 201.

The device 213 may include applications 218, a cryptographic component 219, and a browser 221.

The applications 218 may be configured to perform functions at the device 213. The applications 218 may include an application configured to implement an agent of the RMS 201, an application configured to enroll a device with the RMS 201, an application configured to implement an MDM policy obtained in an MDM policy file, an application to obtain an ID Token, an application for receiving authentication credentials for a user to log in to the device 213, an application for receiving authentication credentials for a user to log in to a portal of the RMS 201, an application for supporting the registration and utilization of a DUK (e.g., which may be implemented as, or as part of, an agent of the RMS 201), and the like.

The cryptographic component 219 may be used to store secrets at the device 213 (e.g., certificates, key pairs, etc.). In some examples, the cryptographic component 219 is implemented within a dedicated cryptographic integrated circuit that is located on the device 213 and that can only be accessed by the device 213. That is, the cryptographic integrated circuit may not be moved from the device 213 to another device and, even if the cryptographic integrated circuit is moved to another device, it may be inaccessible. In some examples, the cryptographic component 219 is a dedicated hardware integrated circuit that is permanently (e.g., extremely difficult or impossible to be removed from the device 213 without damage) or semi-permanently (e.g., soldered) fixed to the device 213. Accordingly, private keys stored in the cryptographic component 219 may be known only to the device 213 and may be accessible to the device 213 to the exclusion of all others, including the computing network 205 and the RMS 201. In some examples, the cryptographic component 219 is implemented using Apple's Secure Enclave or Microsoft's Trusted Platform Module (TPM).

The browser 221 may be an Internet browser (e.g., Chrome, Firefox, Internet Explorer, Edge, etc.). The browser 221 may provide a user a graphical access to Internet and other browser-based services. In some examples, the browser 221 supports continued user access to a service—e.g., based on storing cookies, tokens, or both, within the browser 221. The browser 221 may include an extension that supports the registration and utilization of a DUK. In some examples, the extension may be used to access the agent (which may be referred to as the DURT agent) of the RMS 201 that is installed at the device 213 to support the registration and utilization of a DUK. In some examples, the extension may be configured to initiate and terminate operation of the agent.

Figure 3:
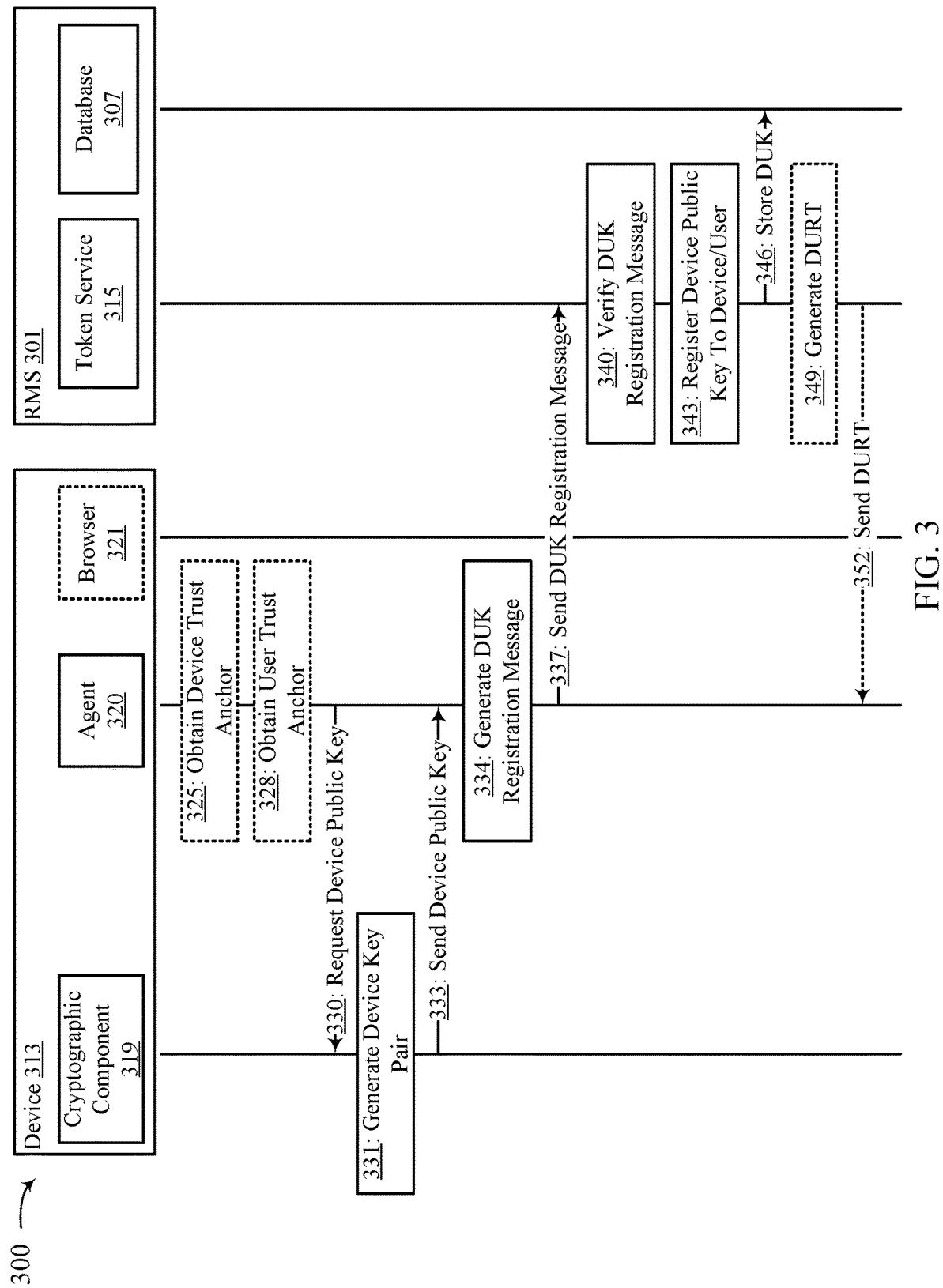
FIG. 3 shows an example of a set of operations for registering and utilizing a device user key in accordance with examples disclosed herein.

FIG. 3 shows an example of a set of operations for registering and utilizing a device user key in accordance with examples disclosed herein.

The process flow 300 may be performed by the device 313, the RMS 301, and the external resource 304, which may be respective examples of a device (e.g., one or more of the devices 113 of FIG. 1, the device 213 of FIG. 2), an RMS (e.g., the RMS 101 of FIG. 1, the RMS 201 of FIG. 2) described herein. In some examples, the process flow 300 shows an example set of operations performed to support registering and utilizing a device user key. For example, the process flow 300 may include operations for registering, at an RMS, a DUK to a unique device/user combination. And may further include operations for obtaining a DUST based on registering the DUK.

At 325, a device trust anchor may be obtained for the device 313. The device trust anchor may include information that can be used to verify, with high certainty, that a device is indeed the particular device that the device purports to be. In some examples, an application installed at the device 313 (e.g., the agent 320 of the RMS 301) enrolls a device with the RMS 301 and receives a certificate that uniquely identified the device upon successful enrollment. In some examples, an application installed at the device 313 (e.g., the agent 320 of the RMS 301) obtains an MDM certificate as the device trust anchor. The application may obtain the MDM certificate as part of an MDM procedure of after an MDM procedure is completed (e.g., from storage). In some examples, the application obtains a serial number of the device 313 as the trust anchor—e.g., if the serial number of the device 313 is stored at a web-accessible location, the RMS 301, or the like.

At 328, a user trust anchor may be obtained for a user that is currently accessing the device 313. The user trust anchor may include information that can be used to verify, with high certainty, that a user is indeed the particular user that the user purports to be. In some examples, an application installed at the device 313 (e.g., the agent 320 of the RMS 301) obtains an ID token as the user trust anchor. The application may obtain the ID token as part of performing an Open ID flow with the RMS. In some examples, the application obtains personal or biometric information of the user as the user trust anchor—e.g., if the biometric information of the user is stored at a web-accessible location, the RMS 301, or the like.

At 330, a device public key may be requested. The agent 320 may request the device public key based on obtaining the device trust anchor and the user trust anchor. In some examples, the agent 320 obtains the device trust anchor, the user trust anchor, and requests the device public key based on a user initiated at the device 313 a process for registering a DUK at the RMS.

At 331, a device key pair may be generated at the device—e.g., in response to the request from the agent 320. The cryptographic component 319 may generate the device key pair. In some examples, the cryptographic component 319 generates the device key pair in response to a request received from the agent 320. The device key pair may be associated with the device/user combination of the device 313 and the current user of the device 313—e.g., based on the current user of the device 313 initiating the generation of the device key pair—e.g., based on the user logging into the device 313, user logging into the RMS 301, and the like. Based on generating the device key pair, the cryptographic component 319 may generate a device key identifier that identifies the device key pair for subsequent access.

At 333, the device public key may be sent to the agent 320. In some examples, a device key identifier for the corresponding device key pair may also be sent to the agent 320.

At 334, a DUK registration message may be generated. The agent 320 may generate the message using the device trust anchor, the user trust anchor, and the device public key of the device key pair. In some examples, to generate the registration message, the agent 320 includes the user trust anchor (e.g., the ID token) and the device public key in the registration message and signs the registration message with the device trust anchor (e.g., the device certificate, the MDM certificate). The agent 320 may also include device key identifier associated with the device key pair in the registration message.

In some examples, the registration message is structured as follows.

```
Header {
    alg:   Certificate Algorithm.
    kid:   Key ID - Unique ID for the client to identify the device key
pair (e.g., in the TPM/SE).
    typ:   Type - JavaScript Object Notation (JSON) web token
           (JWT)
    x5c:   Certificate Chain.
}
Body {
    duk:    JSON web key (JWK) (string) - Device Public Key.
    system: Object_ID (objectID).
    token:  idToken (string).
}
```

At 337, the DUK registration message may be sent to the RMS 301. In some examples, the agent 320 sends the DUK registration message directly to the RMS 301 via an API of the RMS 301. The API of the RMS 301 may be referred to as a DURT API. In some examples, the token service 315 supports the operation of the DURT API. In other examples, the agent 320 sends the DUK registration message to the RMS 301 via the browser 321—e.g., via an extension of the browser 321 that interfaces with the agent 320 and the API of the RMS 301. The DUK registration message may be received at the token service 315.

At 340, the DUK registration message may be verified. The token service 315 may verify that the value of the user trust anchor (e.g., the ID token) matches the value of the user trust anchor possessed (e.g., stored) by the token service 315. The token service 315 may further check that the DUK registration message has not been altered by verifying that the received DUK registration message was signed by the device trust anchor (e.g., the device certificate, the MDM certificate)—using the device trust anchor possessed by the token service 315.

At 343, based on verifying the user trust anchor and confirming that the DUK registration message has not been altered, the token service 315 may register, as a DUK, the device public key received in the DUK message to the device/user combination that corresponds to the device trust anchor and the user trust anchor indicated in the DUK message.

By registering the device public key as the DUK for the device/user combination, a mechanism that is cryptographically rooted within (and cannot be transferred out of) the device 313 itself may be used to uniquely identify and verify a device/user combination for future operations, and without sharing secret information (e.g., the device private key) with another party (not even the RMS 301). Moreover, by maintaining the secret information at the device 313 itself, security measures at the device 313 (e.g., biometrics) may be used to provide access to the secret information.

At 346, based on registering the DUK to the device/user combination, the DUK may be stored. The token service 315 may store the DUK in the database 307. In some examples, based on registering the DUK, the token service 315 may store an association (e.g., a mapping, a link, a code corresponding to the user/device, etc.) between the DUK and the device/user combination. In some examples, based on registering the DUK, the token service 315 may store an identifier for the DUK, which may correspond to the device key identifier stored at the device 313 for the device key pair.

At 349, based on registering the DUK, a DURT may be generated—e.g., as a random collection of letters and numbers. In some examples, the DURT may be generated automatically in response to the DUK being registered. In some examples, the DURT may be associated with the device/user combination—e.g., by associating the DURT with the DUK. In some examples, the DURT, the association between the DURT and the DUK, or both, may be stored in the database 307. In some examples, the token service 315 may generate a DURT key identifier for the DURT and may store the DURT key identifier in the database 307—e.g., with the DURT.

In some examples, the DURT may indicate a security level associated with obtaining the DURT—e.g., by indicating one or more authentication methods that were used to obtain the DURT. In some examples, if the DUK registration was initiated based on a user logging into the device 313, the DURT may indicate that a password was used to obtain the DURT. In some examples, if the DUK registration was initiated based on a user logging into the device 313 and providing a biometric (e.g., fingerprint, face scan, etc.), the DURT may indicate that a password and biometric was used to obtain the DURT. In some examples, if the DUK registration was initiated based on a user logging into the RMS 301 and accepting a push notification, the DURT may indicate that a password and push challenge was used to obtain the DURT.

By indicating the authentication measures used to obtain the DURT, the authentication measures (including authentication measures provided by the device 313 itself) may be integrated into the DURT and used for subsequent operations. For example, when the device 313 requests access to a service that requires biometric verification of the user, the DURT may be used to verify that a user had to be authenticated with a biometric to obtain the DURT, which may be acceptable to the service. By integrating, into the DURT, authentication operations (e.g., biometrics) inputted directly into the device 313, procedure for obtaining certain authentication measures (e.g., biometrics) for accessing a service may be simplified—e.g., relative to performing a separate procedure, separate hardware, or both, for obtaining this information.

The DURT may be a single-use token. The DURT token may expire if not periodically refreshed, if used within a duration, or both. In some examples, the DURT may expire if it is not refreshed within a recurring period (e.g., every fourteen (14) days) that restarts from the last refresh. In some examples, the DURT may expire if a user does not provide an authentication factor (e.g., a biometric) within a recurring period (e.g., every 8 hours), at a recurring event (e.g., sign-on), or both. In some examples, the DURT may expire if not used within a duration (e.g., 90 days), regardless of whether the DURT is being periodically refreshed.

In some examples, the DURT message is structured as follows.

```
{
    aud:    Audience - The DURT API.
    exp:    Expiration (time code) - Epoch DURT expires.
    iat:    Issued At (time code) - Epoch DURT was minted.
    iss:    Issuer - GUID of the registration. ID for the client.
    kid:    Key ID - Unique ID for the client to identify the device key pair (e.g., the TPM/SE).
    rat:    Requested At (time code) - Epoch this refresh chain started. Enables refresh ability.
    sub:    Subject - User email of user associated with DUK.
    org:    OrganizationID.
    amr:    Authentication Method References - Array of strings that represent factors used during user authentication. Selected from one or more of password, push, time-based one-time password (TOTP), text, call, biometric, etc.
    system: SystemID.
}
```

An example DURT message generated in accordance with the above DURT message structure is as follows.

```
{
    aud:    https://dt.hostname.com/         //e.g., hostname of the token
                                               service 315.
    exp:    1677008108.
    iat:    1675798508.
    iss:    afoij3a-234j-0af9-aflkje-aneolcpe2i93ja0.
    kid:    awoSECIkdfsjoake-29dfjafDa_AKejifeal2DAF82=.
    rat:    1675445569.
    sub:    username@hostname.com,           //username for user associated
                                               with DURT.
    org:    308sfad689adfffe35.
    amr:    ["password", "push"].
    system: 123abc.
}
```

In some examples, the token service 315 may sign the DURT using a secret or private key held by the token service 315—a corresponding public key may be used to verify the signature of the private key.

At 352, the DURT may be sent to the device 313. In some examples, the token service 315 sends the DURT directly to the agent 320 via an API of the RMS 301. In some examples, the token service 315 sends the DURT to the agent 320 via the browser 321—e.g., via an extension of the browser 321 that interfaces with the agent 320 and the API of the RMS 301. In some examples, the DURT may be received at the browser 321 and, in some examples, routed to the agent 320. In other examples, the DURT may be received at the agent 320.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
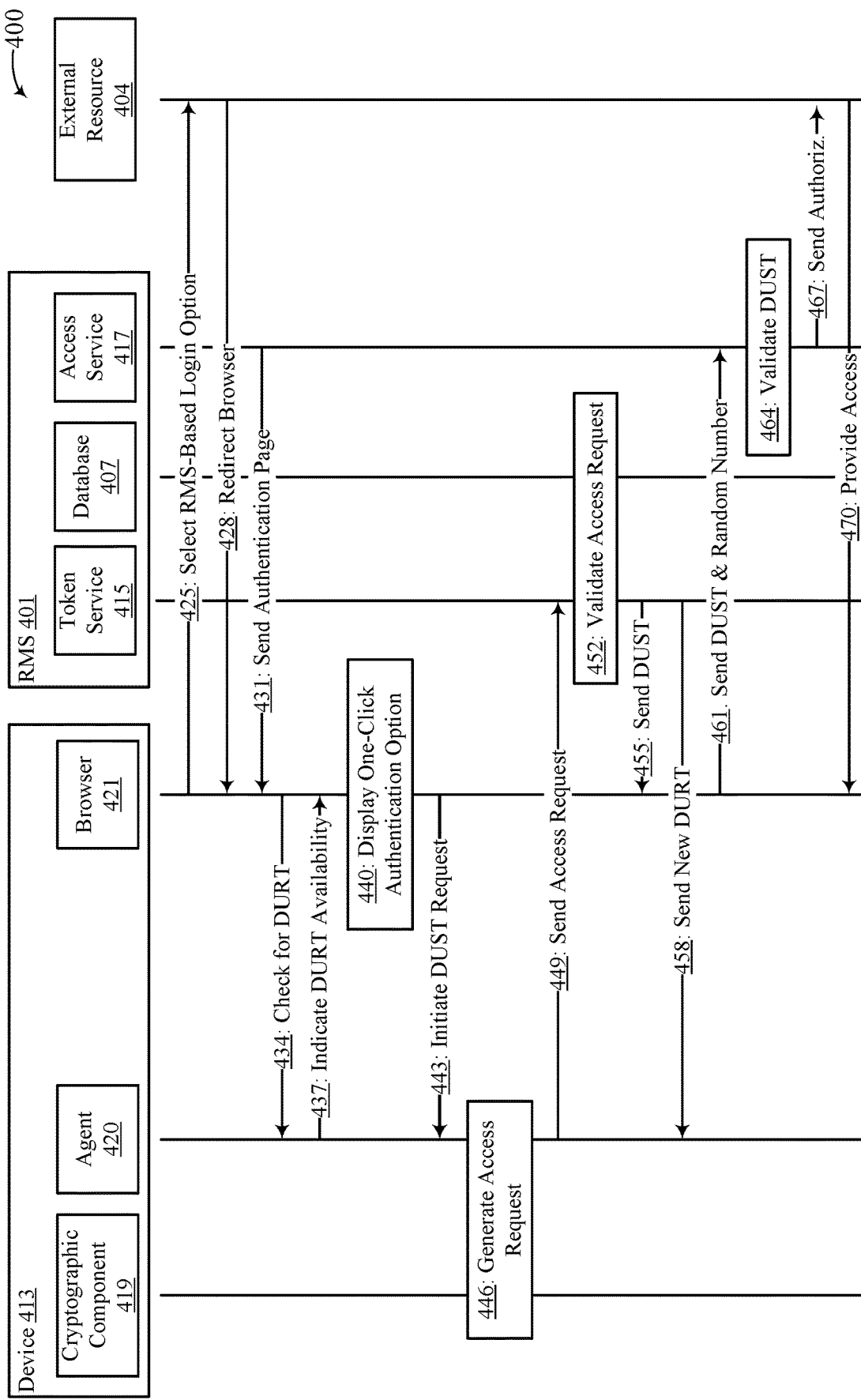
FIG. 4 shows an example of a set of operations for registering and utilizing a device user key in accordance with examples disclosed herein.

FIG. 4 shows an example of a set of operations for registering and utilizing a device user key in accordance with examples disclosed herein.

The process flow 400 may be performed by the device 413, the RMS 401, and the external resource 404, which may be respective examples of a device (e.g., the one or more devices 113 of FIG. 1, the device 213 of FIG. 2, the device 313 of FIG. 3), an RMS (e.g., the RMS 101 of FIG. 1, the RMS 201 of FIG. 2, the RMS 301 of FIG. 3), and an external resource (e.g., the first external resource 104-1 of FIG. 1, the external resource 204-2 of FIG. 2) described herein. In some examples, the process flow 400 shows an example set of operations performed to support registering and utilizing a device user key. For example, the process flow 400 may include operations for utilizing a DUK that is registered at an RMS and a DUST obtained using the DUK to obtain a session token (e.g., a DUST) that grants a device access to an external resource. And may further include operations for utilizing a DUST to gain access to an external resource.

At 425, an option for logging into the external resource 404 that is displayed at the browser and that references the RMS 401 may be selected. In some examples, the external resource 404 provides a log-in page to the browser 421. The browser 421 may display the log-in page to a user of the device 413, and the log-in page may include one or more options for gaining access to the external resource 404 (including an option that references the RMS 401). The browser 421 may send, to the external resource 404, the selection of the login option that references the RMS 401 based on the user selecting a button that that references the RMS 401.

At 428, the browser 421 may be redirected to the RMS 401. In some examples, the external resource 404 may redirect the browser to a login service hosted by the RMS 401 in response to the user selecting the button that references the RMS 401.

At 431, based on being redirected to the login service, an authentication page of the RMS 401 may be sent to the browser 421. The authentication page may include a request for the current user of the device 413 to provide authentication credentials that grant the user access to aspects of the RMS 401 (e.g., a user portal).

At 434, based on processing the authentication page, an operation for determining whether the device 413 is storing a valid DURT may be performed. In some examples, an extension at the browser 421 may be triggered into operation based on the authentication page being processed by the browser 421. Based on being triggered into operation, the extension at the browser 421 may send a message to the agent 420 to determine whether a DURT is stored for the current user of the device 413. In some examples, the extension at the browser 421 starts the agent 420 based on being triggered into operation—e.g., causes the device 413 to initiate a process that supports the operation of the agent 420.

At 437, in response to the message from the browser, an indication of whether a valid DURT is stored for the current user of the device 413 may be sent to the browser 421. In some examples, the agent 420 sends a response indicating that a valid DURT is stored for the current user of the device 413. In some examples, the agent 420 may also send data associated with the user in the response—e.g., a name of the user, an email address of the user, a picture of the user, etc. In other examples, the agent 420 sends a response indicating that no DURT (or no valid DURT, e.g., an expired DURT) is stored for the current user of the device 413.

At 440, based on receiving an indication that a valid DURT is stored for the current user of the device 413, a one-click authentication option may be displayed to the user. In some examples, the browser extension causes the browser 421 to display the one-click authentication option. The one-click authentication option may be a button that includes a picture of the user, a name of the user, an email address of the user, or any combination thereof.

At 443, a procedure for requesting a DUST (using the valid DURT stored at the device 413) may be initiated. In some examples, the browser 421 (or the extension at the browser 421) may send a message to the agent 420 that causes the agent 420 to initiate the DUST request procedure.

At 446, an access request may be generated, where the access request may be used to request a DUST from the RMS 401. In some examples, the cryptographic component 419 and the agent 420 collectively generate the access request. To generate the access request, the agent 420 may include the DURT in the payload of the access request.

In some examples, to generate the access request, the agent 420 may also generate a string of random characters (e.g., a string of random number, a string of random alpha-numericals, etc.) and compute a hash of the string of random characters. The string of random characters may be stored in the memory (e.g., the random-access memory) of the device 413. In such cases, the agent 420 may include both the DURT and the hash of the string of random characters in the payload of the access request.

In some examples, the access request is structured as follow

```
{
    type AccessReq struct {
        // Standard JWT Claims.
        aud:        Audience.
        exp:        Expiration (time code) - Epoch DURT expires.
        iat:        Issued At (time code) - Epoch DURT was minted.
        iss:        Issuer.
        sub:        Subject. Same as Issuer.
        // Client Cred Claims.
        jti:        JSON Token ID - Unique.
        kid:        Key ID - Key identifier used to register the
                    DURT.
        // Special Claims.
        durt:       DURT.
        nonce:      Nonce.
        challenge:  Hash of string of random characters. Used by target
    resource to prevent interception of the DUST.
    }
```

An example access request message generated in accordance with the above access request structure is as follows.

```
{
    aud:        https://dt.hostname.com/,      //e.g., hostname of the token service 415.
    exp:        1675807218.
    iat:        1675806918.
    iss:        afoij3a-234j-0af9-aflkje-aneolcpe2i93ja0.
    jti:        Pafe923ssEJFFS202423dsj.
    kid:        awoSECIkdfsjoake-29dfjafDa__AKejifeal2DAF82=.
    sub:        afoij3a-234j-0af9-aflkje-aneolcpe2i93ja0.
    challenge:  cdisasfo3A9aDalaDPeAd92fs3fjSklkds354.
    durt:
        asfjoe938sJKe2389uHidhfwei38IDJ38dhjIDKeifslop8932r98fjh89uHidhfJ38dhjID9
        uHidhfwe9uHidhfwewei38IDJ38dhjID2389uHidhfwei38IDJ38dKe2389uHidhfwei
        38IDJ38dhjIDKeifslop8932r98fjh89uHidhei38IDJ38dhjID23Hidhfwei38IDJ38dhjI
        DKeifslop8932r98fjh89uHidhfJ38dhjID9uHidhfwe9uHidhfwewei38IDJ38dhjID23
        89uH8dhjID23.
}
```

After generating the payload of the access request, the agent 420 may send the payload to the cryptographic component 419, and the cryptographic component 419 may sign the payload using the device private key that corresponds to the DUK stored at the RMS 401 for the combination of the device 413 and the current user of the device 413—the device public key may be used to verify the signature of the device private key.

At 449, the access request may be sent to the RMS 401. In some examples, the agent 420 sends the access request to the token service 415—e.g., using a DURT API supported by the token service 415.

At 452, the access request may be validated. To validate the DURT, the token service 415 may confirm that the DURT is stored in the database 407. Additionally, or alternatively, to validate the access request, the token service 415 verifies that the DURT is signed by the device private key. Additionally, or alternatively, the token service 415 may also verify that the DURT is signed by a secret or private key held by the token service 415. Additionally, or alternatively, the token service 415 may verify that the issuer of the DURT and the issuer named in the access request match. Additionally, or alternatively, the token service 415 may confirm that the DURT has not expired. Additionally, or alternatively, the token service 415 may verify that the DURT key identifier stored at the database 407 matches the DURT key identifier included in the access request. Additionally, or alternatively, the token service 415 may verify that the DURT included in the access request is the latest DURT issued for the device/user combination—e.g., that a new DURT has not been issued for the device/user combination after the DURT included in the access request was issued.

By confirming that the DURT included in the access request is the latest issued DURT for the device/user combination, forking of the DURT chain may be prevented. That is, the token service 415 may be prevented from generating a new DURT from one or more previously issued DURTs that are still valid but superseded by the latest issued DURT.

The token service 415 may generate the DUST based on validating the access request. In some examples, the DUST may be associated with the device/user combination. In some examples, the DUST, the association between the DUST and the device/user combination, or both, may be stored in the database 407. In some examples, the token service 415 may generate a DUST key identifier for the DUST and may store the DUST key identifier in the database 407—e.g., with the DUST.

In some examples, the DUST may indicate a security level associated with obtaining the DUST, as similarly described with reference to the operations described at 349 of FIG. 3. In some examples, the DUST may indicate the same security level as the DURT. In other examples, the DUST may indicate a different (e.g., higher) security level than the DURT—e.g., if the user is required to complete an additional authentication operation, such as a push verification, to obtain the DUST.

The DUST may be a single-use token that provides the user access to the external resource 404 a single-time. In such cases, to maintain a session with the external resource (e.g., if the user leaves and returns to the service), aspects of the procedure for obtaining a DUST (e.g., beginning with the operations described at 446) may be repeated to verify the user is still authorized to access the external resource 404.

In some examples, the DUST message is structured as follows.

```
{
    aud:        Audience.
    exp:        Expiration (time code) - Epoch this token expires.
    iat:        Issued At (time code) - Epoch this token was minted.
    iss:        Issuer.
    sub:        Subject - User email.
    amr:        Authentication Method References - Array of strings that represent factors
    used during user authentication. Selected from one or more of "password", "push", "TOTP",
    "text", "call", "biometric", etc.
    challenge:  Used by target resource to prevent interception of the sessionToken.
    system:     SystemID.
    org:        OrganizationID.
}
```

An example DUST message generated in accordance with the above DUST message structure is as follows.

```
{
    aud:            https://acc.hostname.com/,        //e.g., hostname of the
                                                      access service 417.
    exp:            1675810137.
    iat:            1675810077.
    iss:            https://dt.hostname.com/          //e.g., hostname of the
                                                      token service 415.
    sub:            username@hostname.com             //username for user
associated with DUST.
    amr:            ["password", "push"].
    challenge:      cdisasfo3A9aDalaDPeAd92fs3fjSklkds354.
    system:         123abc.
    org:            308sfad689adfffe35.
}
```

In some examples, the token service 415 may sign the DUST using a secret or private key held by the token service 415—a corresponding public key may be used to verify the signature of the private key.

At 455, based on the access request being validated, the DUST may be sent to the device 413. In some examples, the DUST may be sent directly to the agent 420. In some examples, the DUST may be sent to the agent 420 via the browser 421. In some examples, the DUST may be sent directly to the browser 421. In some examples, the DUST may be sent to the browser 421 via the agent 420.

At 458, based on the access request being validated and the DUST being sent to the device 413, a new DURT may also be sent to the device 413. In some examples, the new DURT may be sent directly to the agent 420. In other examples, the new DURT may be sent to the agent 420 via the browser 421.

At 461, the DUST and, in some examples, the string of random characters, may be sent to the RMS 401. The browser 421 may send the DUST and string of random characters to the access service 417.

At 464, the access service 417 may validate the DUST. To validate the DUST, the access service 417 may confirm that the DUST is stored in the database 407. Additionally, or alternatively, the access service 417 may verify that the DUST is signed by a secret or private key held by the token service 415. Additionally, or alternatively, the access service 417 may complete the challenge embedded in the DUST using the string of random characters received with the DUST.

Based on validating the DUST, the access service 417 may confirm that the authentication measures associated with the DUST (e.g., the authentication measures indicated in the DUST) comply with the security requirements of the external resource 404. For example, the access service 417 may determine that the external resource 404 requires a single factor of authentication (e.g., a password) and that the DUST was obtained using at least the single factor authentication.

In another example, the access service 417 may determine that the external resource 404 requires multiple factors of authentication (e.g., a password and push verification) and that the DUST was obtained using a single factor authentication (e.g., a password). In such cases, the access service 417 may send the user to a push verification prior to enable the user to satisfy the security requirements of the external resource.

In another example, the access service 417 may determine that the external resource 404 requires a biometric factor of authentication (e.g., a password and fingerprint) and that the DUST was obtained using a biometric factor (e.g., a fingerprint)—provided at the device 413 as part of an initial procedure for obtaining the DURT.

At 467, based on validating the DUST and verifying that adequate security measures for accessing the external resource 404 have been performed, an indication that the user has been approved for access to the external resource may be sent to the external resource 404. In some examples, the access service 417 sends a security assertion markup language (SAML) message to the external resource 404 that indicates the user is authorized for access to the external resource 404.

At 470, in response to the authorization indication, access to the external resource 404 may be provided to the user. In some examples, the external resource 404 grants the user access to one or more services hosted at the external resource based on receiving the indication from the access service 417 that the user has been authorized for access.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement or be combined with one or more of the operations described in the process flow 400.

Figure 5:
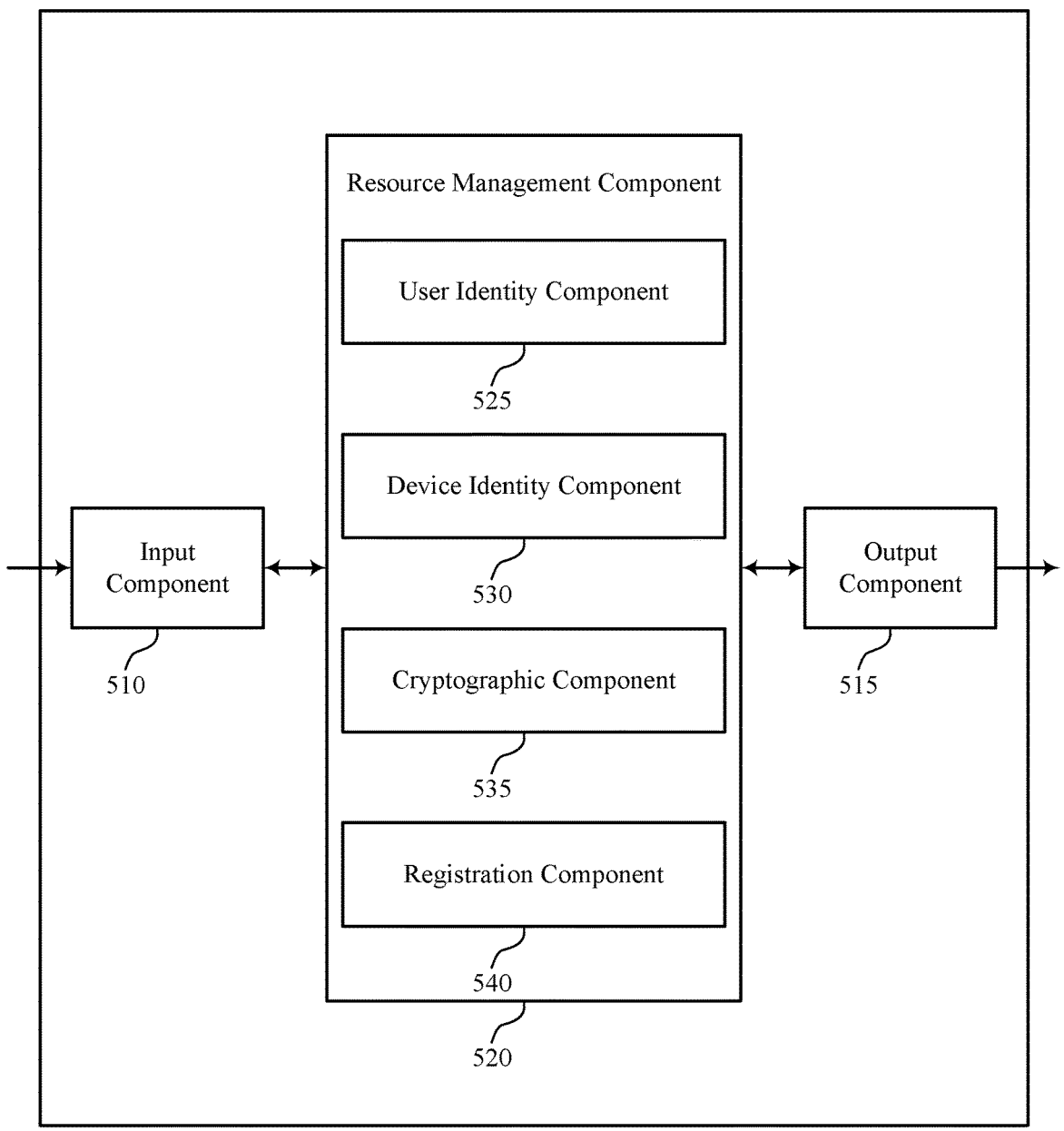
FIG. 5 shows an example of a device that supports registering and utilizing a device user key in accordance with examples disclosed herein.

FIG. 5 shows an example of a device that supports registering and utilizing a device user key in accordance with examples disclosed herein.

The device 500 may be an example of aspects of one or more components described with reference to FIG. 1, such as one or more of the devices 113. The device 500 may include an input component 510, an output component 515, and a resource management component 520. The device 500 may also include one or more processors. Each of these components may be in communication with one another (e.g., via one or more buses, communications links, communications interfaces, or any combination thereof).

The input component 510 may manage input signals for the device 500. For example, the input component 510 may identify input signals based on an interaction with a modem, a keyboard, a mouse, a touchscreen, or a similar device. These input signals may be associated with user input or processing at other components or devices. In some cases, the input component 510 may utilize an operating system such as iOS®, ANDROID®, MS-DOS®, MS-WINDOWS®, OS/2®, UNIX®, LINUX®, or another known operating system to handle input signals. The input component 510 may send aspects of these input signals to other components of the device 500 for processing. For example, the input component 510 may transmit input signals to the resource management component 520 to support registering and utilizing a device user key. In some cases, the input component 510 may be a component of an I/O controller 710 as described with reference to FIG. 7.

The output component 515 may manage output signals for the device 500. For example, the output component 515 may receive signals from other components of the device 500, such as the resource management component 520, and may transmit these signals to other components or devices. In some specific examples, the output component 515 may transmit output signals for display in a user interface, for storage in a database or data store, for further processing at a server or server cluster, or for any other processes at any number of devices or systems. In some cases, the output component 515 may be a component of an I/O controller 710 as described with reference to FIG. 7.

For example, the resource management component 520 may include a user identity component 525, a device identity component 530, a cryptographic component 535, a registration component 540, or any combination thereof. In some examples, the resource management component 520, or various components thereof, may be configured to perform various operations (e.g., receiving, monitoring, transmitting) using or otherwise in cooperation with the input component 510, the output component 515, or both. For example, the resource management component 520 may receive information from the input component 510, send information to the output component 515, or be integrated in combination with the input component 510, the output component 515, or both to receive information, transmit information, or perform various other operations as described herein.

The user identity component 525 may be configured as or otherwise support a means for obtaining first information that asserts an identity of the device. The device identity component 530 may be configured as or otherwise support a means for obtaining second information that asserts an identity of a user of the device. The cryptographic component 535 may be configured as or otherwise support a means for generating, at a cryptographic component internal to the device, a public key of the device that corresponds to a private key of the device stored in the cryptographic component. The registration component 540 may be configured as or otherwise support a means for registering, with a service of a resource management system that is operated by a party, the public key of the device to a combination of the device and the user, where registering the public key of the device includes. The registration component 540 may be configured as or otherwise support a means for sending, to the service of the resource management system, a registration message that indicates the first information that asserts the identity of the device, the second information that asserts the identity of the user, and the public key of the device.

Figure 6:
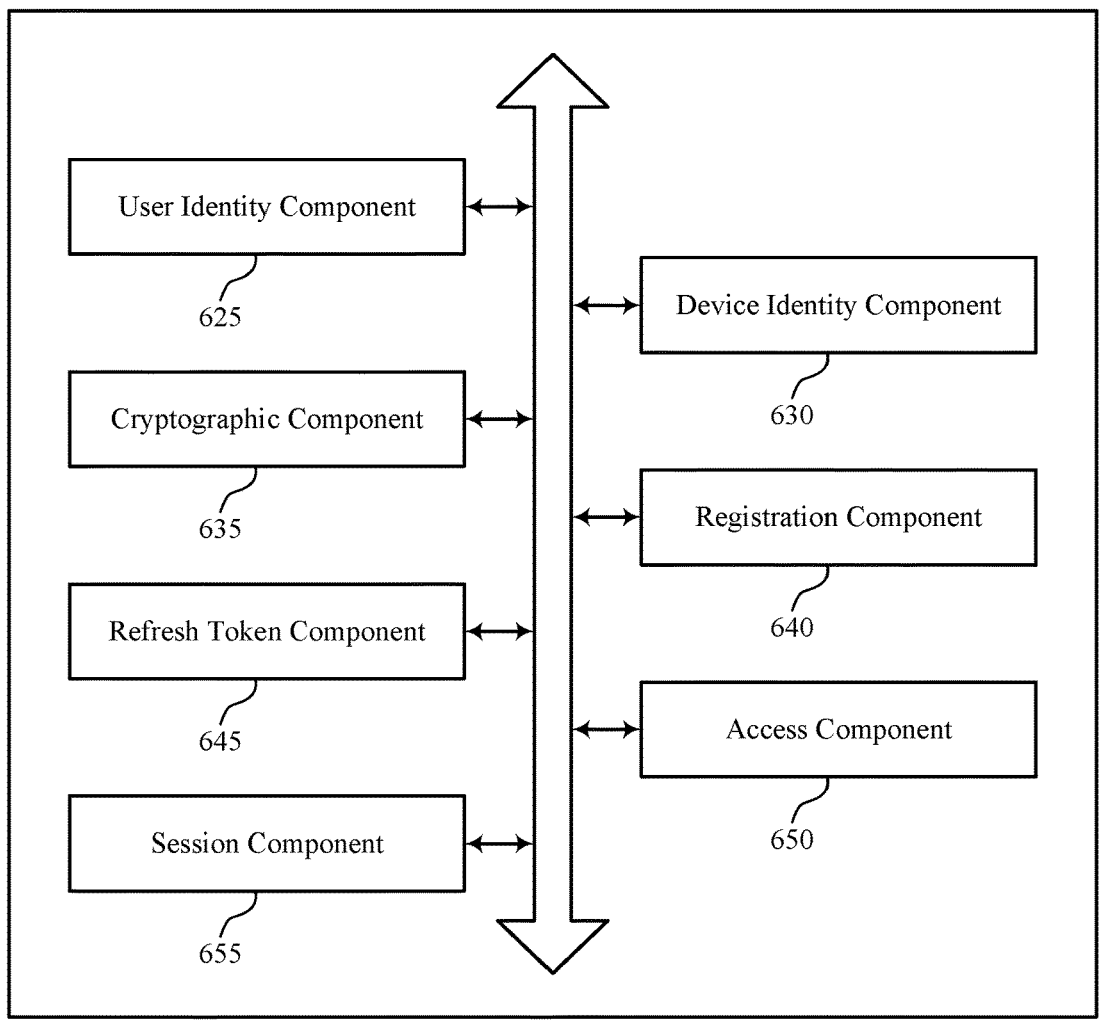
FIG. 6 shows an example of a resource management component that supports registering and utilizing a device user key in accordance with examples disclosed herein.

FIG. 6 shows an example of a resource management component that supports registering and utilizing a device user key in accordance with examples disclosed herein.

The resource management component 620 may be an example of aspects of a resource management component or a resource management component 520, or both, as described herein. The resource management component 620, or various components thereof, may be an example of means for performing various aspects of registering and utilizing a device user key as described herein. For example, the resource management component 620 may include a user identity component 625, a device identity component 630, a cryptographic component 635, a registration component 640, a refresh token component 645, an access component 650, a session component 655, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The user identity component 625 may be configured as or otherwise support a means for obtaining first information that asserts an identity of the device. The device identity component 630 may be configured as or otherwise support a means for obtaining second information that asserts an identity of a user of the device. The cryptographic component 635 may be configured as or otherwise support a means for generating, at a cryptographic component internal to the device, a public key of the device that corresponds to a private key of the device stored in the cryptographic component. The registration component 640 may be configured as or otherwise support a means for registering, with a service of a resource management system that is operated by a party, the public key of the device to a combination of the device and the user, where registering the public key of the device includes. In some examples, the registration component 640 may be configured as or otherwise support a means for sending, to the service of the resource management system, a registration message that indicates the first information that asserts the identity of the device, the second information that asserts the identity of the user, and the public key of the device.

In some examples, the registration component 640 may be configured as or otherwise support a means for generating, after the public key of the device is generated, the registration message, where a payload of the registration message includes the public key of the device and the second information that asserts the identity of the user. In some examples, the registration component 640 may be configured as or otherwise support a means for signing, after the registration message is generated, the payload of the registration message with the first information that asserts the identity of the device.

In some examples, the refresh token component 645 may be configured as or otherwise support a means for receiving, based on the public key of the device being registered to the combination of the device and the user at the service of the resource management system, a refresh token.

In some examples, the refresh token includes a timestamp indicating when the refresh token was issued, an identifier of the refresh token, an indication of authentication measures used to obtain the refresh token, or any combination thereof.

In some examples, the access component 650 may be configured as or otherwise support a means for requesting, after the refresh token is received, access to resources of a second party. In some examples, the session component 655 may be configured as or otherwise support a means for sending, based on the access to the resources of the second party being requested, the refresh token to the service of the resource management system. In some examples, the session component 655 may be configured as or otherwise support a means for receiving, in response to the refresh token, a session token associated with accessing the resources of the second party.

In some examples, the session component 655 may be configured as or otherwise support a means for generating an access request that includes the refresh token. In some examples, the session component 655 may be configured as or otherwise support a means for signing the access request with the private key of the device to obtain a signed access request. In some examples, the session component 655 may be configured as or otherwise support a means for sending, after the access request is signed, the signed access request to the service of the resource management system, where the refresh token is sent to the service of the resource management system based on sending the signed access request to the service of the resource management system.

In some examples, the session component 655 may be configured as or otherwise support a means for generating, based on access to the resources of the second party being requested, a string of random characters. In some examples, the session component 655 may be configured as or otherwise support a means for generating a hash of the string of random characters, where the string of random characters is included in the access request as a challenge as part of the access request being generated.

In some examples, the session component 655 may be configured as or otherwise support a means for sending, after receiving the session token, the session token and the string of random characters to a second service of the resource management system, where the session token includes the hash of the string of random characters.

In some examples, the refresh token component 645 may be configured as or otherwise support a means for receiving, in response to sending the refresh token as part of requesting the session token, a second refresh token with the session token, where the refresh token is invalidated based on the second refresh token being issued.

In some examples, the access component 650 may be configured as or otherwise support a means for accessing, based on the session token being received and validated by a second service of the resource management system, the resources of the second party.

In some examples, the session token is signed by a private key of the service of the resource management system.

In some examples, the first information that asserts the identity of the device includes a mobile device management certificate, a certificate obtained as a result of a procedure for enrolling the device with a second service of the resource management system, or both.

In some examples, the second information that asserts the identity of the user includes an identity token obtained for the user.

In some examples, the device identity component 630 may be configured as or otherwise support a means for enrolling, by an agent of the device, the device with a second service of the resource management system. In some examples, the device identity component 630 may be configured as or otherwise support a means for receiving, based on enrolling the device with the second service, a certificate that uniquely identifies the device, where the first information that asserts the identity of the device includes the certificate.

In some examples, the device identity component 630 may be configured as or otherwise support a means for receiving, from a second service of the resource management system, a mobile device management file. In some examples, the device identity component 630 may be configured as or otherwise support a means for setting configurations of the device in accordance with a mobile device management policy indicated in the mobile device management file. In some examples, the device identity component 630 may be configured as or otherwise support a means for receiving, based on setting the configurations, a mobile device management certificate that uniquely identifies the device, where the first information that asserts the identity of the device includes the mobile device management certificate.

In some examples, the user identity component 625 may be configured as or otherwise support a means for sending a request from the user to verify the identity of the user. In some examples, the user identity component 625 may be configured as or otherwise support a means for receiving, from a third service of the resource management system, an identity token that uniquely identifies the user, where the second information that asserts the identity of the user includes the identity token.

Figure 7:
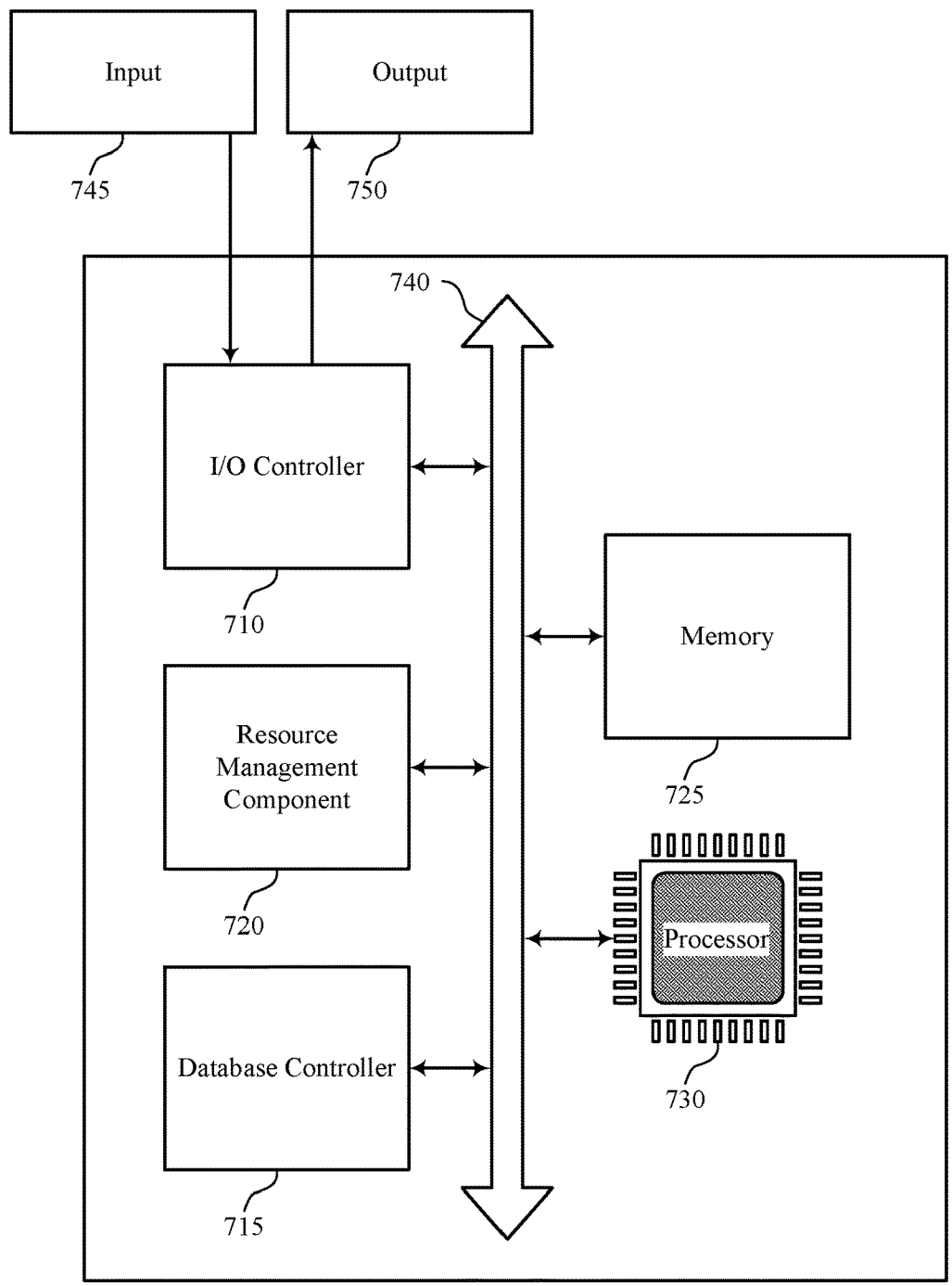
FIG. 7 shows an example of a device that supports registering and utilizing a device user key in accordance with examples disclosed herein.

FIG. 7 shows an example of a device that supports registering and utilizing a device user key in accordance with examples disclosed herein.

The device 705 may be an example of or include the components of a device 500 as described herein. The device 705 may include components for data management, including components such as a resource management component 720, an T/O controller 710, a database controller 715, at least one memory (such as memory 725), at least one processor (such as processor 730), and a database 735. These components may be in electronic communication or otherwise coupled with each other (e.g., operatively, communicatively, functionally, electronically, electrically; via one or more buses, communications links, communications interfaces, or any combination thereof). Additionally, the components of the device 705 may include corresponding physical components or may be implemented as corresponding virtual components (e.g., components of one or more virtual machines). In some examples, the device 705 may be an example of aspects of one or more components described with reference to FIG. 1, such as an RMS 101.

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor. In some examples, a user may interact with the device 705 via the I/O controller 710 or via hardware components controlled by the I/O controller 710.

The database controller 715 may manage data storage and processing in a database 735. The database 735 may be external to the device 705, temporarily or permanently connected to the device 705, or a data storage component of the device 705. In some cases, a user may interact with the database controller 715. In some other cases, the database controller 715 may operate automatically without user interaction. The database 735 may be an example of a persistent data store, a single database, a distributed database, multiple distributed databases, a database management system, or an emergency backup database.

Memory 725 may include random-access memory (RAM) and ROM. The memory 725 may store computer-readable, computer-executable software including instructions that, when executed, cause the processor to perform various functions described herein. In some cases, the memory 725 may contain, among other things, a BIOS which may control basic hardware or software operation such as the interaction with peripheral components or devices.

The processor 730 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In some other cases, a memory controller may be integrated into the processor 730. The processor 730 may be configured to execute computer-readable instructions stored in memory 725 to perform various functions (e.g., functions or tasks supporting registering and utilizing a device user key).

For example, the resource management component 720 may be configured as or otherwise support a means for obtaining first information that asserts an identity of the device. The resource management component 720 may be configured as or otherwise support a means for obtaining second information that asserts an identity of a user of the device. The resource management component 720 may be configured as or otherwise support a means for generating, at a cryptographic component internal to the device, a public key of the device that corresponds to a private key of the device stored in the cryptographic component. The resource management component 720 may be configured as or otherwise support a means for registering, with a service of a resource management system that is operated by a party, the public key of the device to a combination of the device and the user, where registering the public key of the device includes. The resource management component 720 may be configured as or otherwise support a means for sending, to the service of the resource management system, a registration message that indicates the first information that asserts the identity of the device, the second information that asserts the identity of the user, and the public key of the device.

Figure 8:
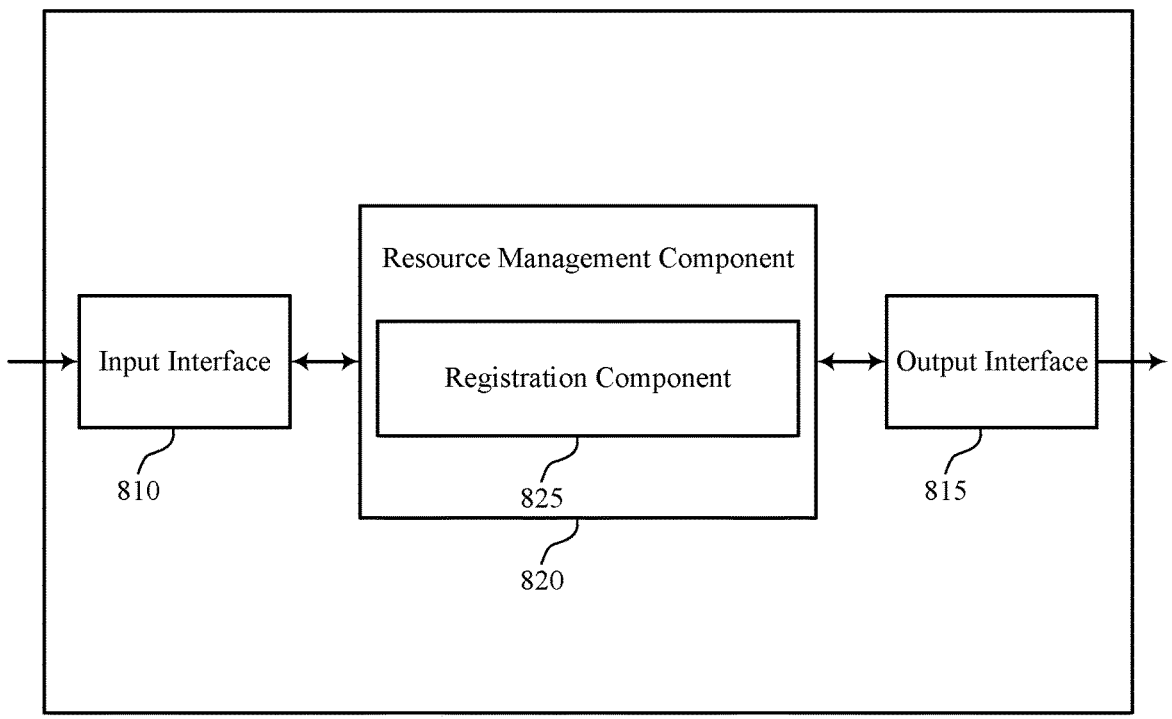
FIG. 8 shows an example of a system that supports registering and utilizing a device user key in accordance with examples disclosed herein.

FIG. 8 shows an example of a system that supports registering and utilizing a device user key in accordance with examples disclosed herein.

The system 800 may be an example of aspects of one or more components described with reference to FIG. 1, such as an RMS 101. The system 800 may include an input interface 810, an output interface 815, and a resource management component 820. The system 800 may also include one or more processors. Each of these components may be in communication with one another (e.g., via one or more buses, communications links, communications interfaces, or any combination thereof).

The input interface 810 may manage input signaling for the system 800. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 800 for processing. For example, the input interface 810 may transmit such corresponding signaling to the resource management component 820 to support registering and utilizing a device user key. In some cases, the input interface 810 may be a component of a network interface 1025 as described with reference to FIG. 10.

The output interface 815 may manage output signaling for the system 800. For example, the output interface 815 may receive signaling from other components of the system 800, such as the resource management component 820, and may transmit such output signaling corresponding to (e.g., representative of or otherwise based on) such signaling to other systems or devices. In some cases, the output interface 815 may be a component of a network interface 1025 as described with reference to FIG. 10.

For example, the resource management component 820 may include a registration component 825, or any combination thereof. In some examples, the resource management component 820, or various components thereof, may be configured to perform various operations (e.g., receiving, monitoring, transmitting) using or otherwise in cooperation with the input interface 810, the output interface 815, or both. For example, the resource management component 820 may receive information from the input interface 810, send information to the output interface 815, or be integrated in combination with the input interface 810, the output interface 815, or both to receive information, transmit information, or perform various other operations as described herein.

The registration component 825 may be configured as or otherwise support a means for receiving, from a device, a registration message that indicates first information that asserts an identity of the device, second information that asserts an identity of a user of the device, and a public key of the device that was generated at a cryptographic component internal to the device and corresponds to a private key of the device stored in the cryptographic component. The registration component 825 may be configured as or otherwise support a means for verifying, at a service of the resource management system that is operated by a party, the first information that asserts the identity of the device and the second information that asserts the identity of the user of the device. The registration component 825 may be configured as or otherwise support a means for registering, at the service of the resource management system, based on verifying the first information that asserts the identity of the device and the second information that asserts the identity of the user of the device, the public key of the device to a combination of the device and the user.

Figure 9:
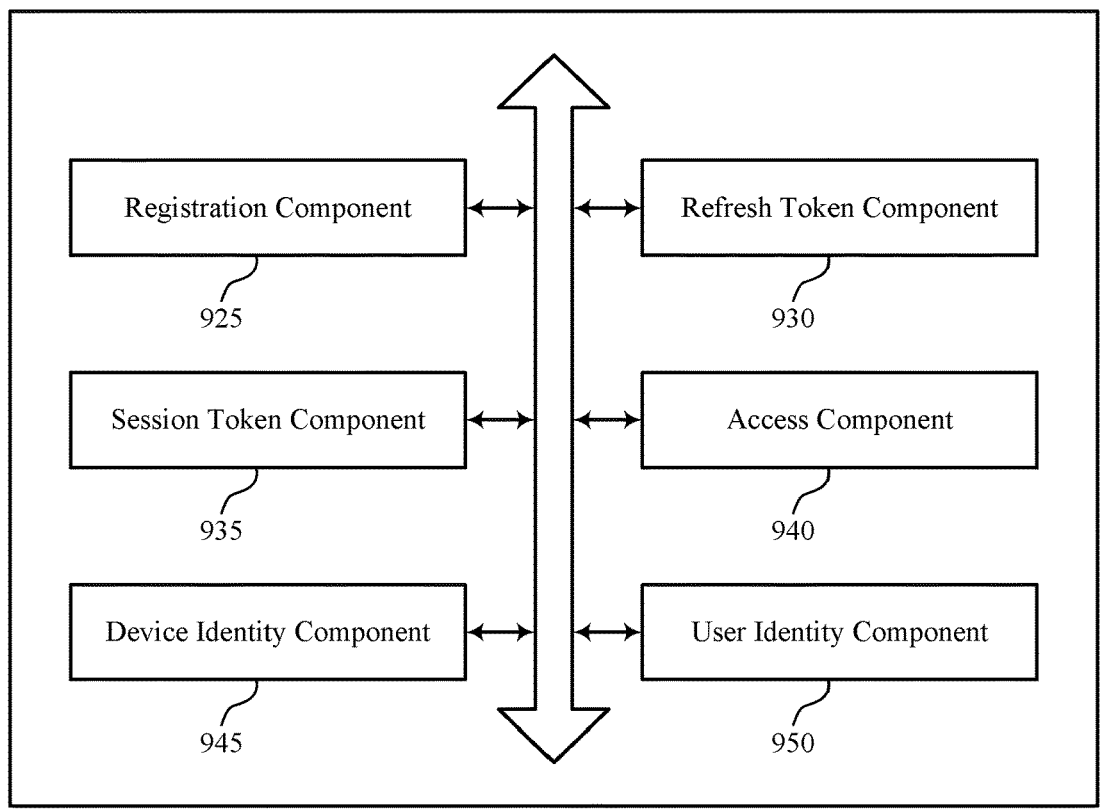
FIG. 9 shows an example of a resource management component that supports registering and utilizing a device user key in accordance with examples disclosed herein.

FIG. 9 shows an example of a resource management component that supports registering and utilizing a device user key in accordance with examples disclosed herein.

The resource management component 920 may be an example of aspects of a resource management component or a resource management component 820, or both, as described herein. The resource management component 920, or various components thereof, may be an example of means for performing various aspects of registering and utilizing a device user key as described herein. For example, the resource management component 920 may include a registration component 925, a refresh token component 930, a session token component 935, an access component 940, a device identity component 945, a user identity component 950, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The registration component 925 may be configured as or otherwise support a means for receiving, from a device, a registration message that indicates first information that asserts an identity of the device, second information that asserts an identity of a user of the device, and a public key of the device that was generated at a cryptographic component internal to the device and corresponds to a private key of the device stored in the cryptographic component. In some examples, the registration component 925 may be configured as or otherwise support a means for verifying, at a service of the resource management system that is operated by a party, the first information that asserts the identity of the device and the second information that asserts the identity of the user of the device. In some examples, the registration component 925 may be configured as or otherwise support a means for registering, at the service of the resource management system, based on verifying the first information that asserts the identity of the device and the second information that asserts the identity of the user of the device, the public key of the device to a combination of the device and the user.

In some examples, the refresh token component 930 may be configured as or otherwise support a means for generating, based on registering the public key of the device to the combination of the device and the user, a refresh token. In some examples, the refresh token component 930 may be configured as or otherwise support a means for sending, based on generating the refresh token, the refresh token to the device.

In some examples, the refresh token component 930 may be configured as or otherwise support a means for generating a payload of the refresh token that includes a timestamp indicating when the refresh token was issued, an identifier of the refresh token, an indication of authentication measures used to obtain the refresh token, or any combination thereof. In some examples, the refresh token component 930 may be configured as or otherwise support a means for signing the payload of the refresh token by a secret or a private key of the service of the resource management system, where the refresh token is generated based on generating and signing the payload.

In some examples, the refresh token component 930 may be configured as or otherwise support a means for receiving, from the device, an access request that includes a refresh token previously sent to the device, where the access request is associated with the device requesting access to resources of a second party. In some examples, the refresh token component 930 may be configured as or otherwise support a means for verifying, using the public key of the device, that the access request is signed by the private key of the device. In some examples, the session token component 935 may be configured as or otherwise support a means for sending, based on verifying the access request, a session token to the device.

In some examples, the session token component 935 may be configured as or otherwise support a means for generating, based on verifying the access request received from the device, a payload of the session token including a timestamp indicating when the session token was issued, an indication of authentication measures used to obtain the refresh token, a hash of a random string of characters obtained from the device in the access request, an issue of the session token, or any combination thereof. In some examples, the session token component 935 may be configured as or otherwise support a means for signing the payload of the session token with a private key of the service of the resource management system.

In some examples, the access component 940 may be configured as or otherwise support a means for receiving, at a second service of the resource management system, from the device, a session token previously sent to the device in response to an access request received from the device, where the access request is associated with the device requesting access to resources of a second party. In some examples, the access component 940 may be configured as or otherwise support a means for verifying, by the second service of the resource management system, a signature of the session token using a public key of the service of the resource management system, the session token being signed by a private key of the service of the resource management system that corresponds to the public key of the service of the resource management system. In some examples, the access component 940 may be configured as or otherwise support a means for sending, from the second service of the resource management system to the second party, based on verifying the signature of the session token, a message authorizing the device and the user of the device to access the resources of the second party.

In some examples, the access component 940 may be configured as or otherwise support a means for receiving, at the second service of the resource management system with the session token, a random string of characters used by the device to generate a first hash of the random string of characters, where the first hash of the random string of characters was included in the access request. In some examples, the access component 940 may be configured as or otherwise support a means for generating, by the second service of the resource management system using the random string of characters, a second hash of the random string of characters. In some examples, the access component 940 may be configured as or otherwise support a means for verifying, by the second service of the resource management system, that a third hash received in the session token matches the second hash of the random string of characters, where the message authorizing the device is sent based on verifying that the third hash matches the second hash of the random string of characters.

In some examples, the device identity component 945 may be configured as or otherwise support a means for receiving, at a second service of the resource management system from an agent of the resource management system that is installed on the device, a request to enroll the device with the second service of the resource management system. In some examples, the device identity component 945 may be configured as or otherwise support a means for enrolling, at the second service of the resource management system in response to the request, the device in the second service of the resource management system. In some examples, the device identity component 945 may be configured as or otherwise support a means for issuing, by the second service of the resource management system, to the agent, a certificate that uniquely identifies the device, where the first information that asserts the identity of the device includes the certificate.

In some examples, the user identity component 950 may be configured as or otherwise support a means for receiving, at a second service of the resource management system from an agent of the resource management system that is installed on the device, a request to verify the identity of the user. In some examples, the user identity component 950 may be configured as or otherwise support a means for verifying, by the second service of the resource management system in response to the request, the identity of the user. In some examples, the user identity component 950 may be configured as or otherwise support a means for issuing, by the second service of the resource management system, to the agent, a token that uniquely identifies the user, where the second information that asserts the identity of the user includes the token.

Figure 10:
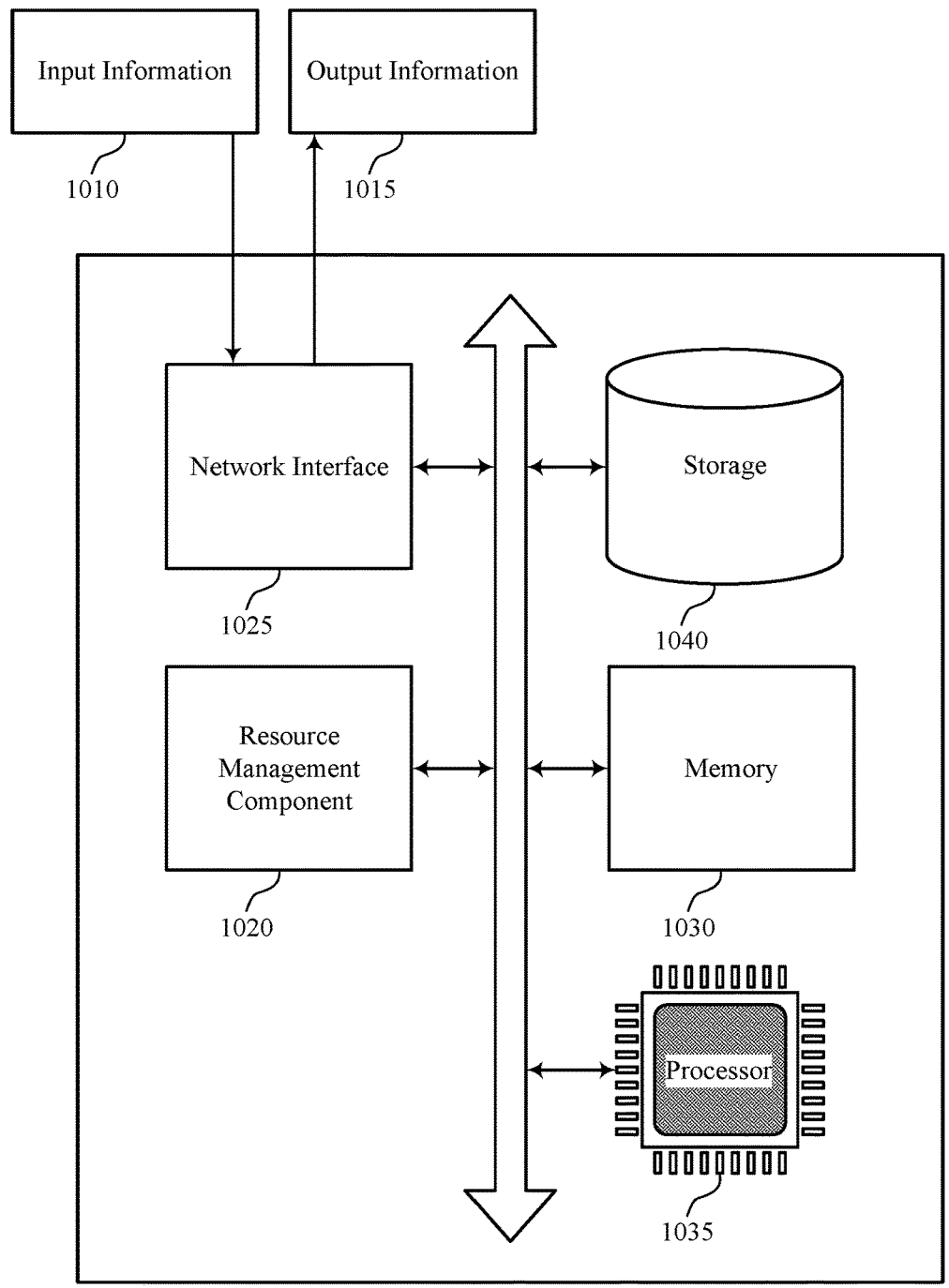
FIG. 10 shows an example of a system that supports registering and utilizing a device user key in accordance with examples disclosed herein.

FIG. 10 shows an example of a system that supports registering and utilizing a device user key in accordance with examples disclosed herein.

The system 1005 may be an example of or include the components of a system 800 as described herein. The system 1005 may include components for data management, including components such as a resource management component 1020, an input information 1010, an output information 1015, a network interface 1025, at least one memory (such as memory 1030), at least one processor (such as processor 1035), and a storage 1040. These components may be in electronic communication or otherwise coupled with each other (e.g., operatively, communicatively, functionally, electronically, electrically; via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as an RMS 101.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 120 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces 165.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories 175.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting registering and utilizing a device user key). Though a single processor (the processor 1035) is depicted in the example of FIG. 10, it is to be understood that the system 1005 may include any quantity of processors and that a group of processors may collectively perform one or more functions ascribed herein to a processor, such as the processor 1035. In some cases, the processor 1035 may be an example of aspects of one or more components described with reference to FIG. 1, such as one or more processors 170.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1, such as one or more network disks 180.

For example, the resource management component 1020 may be configured as or otherwise support a means for receiving, from a device, a registration message that indicates first information that asserts an identity of the device, second information that asserts an identity of a user of the device, and a public key of the device that was generated at a cryptographic component internal to the device and corresponds to a private key of the device stored in the cryptographic component. The resource management component 1020 may be configured as or otherwise support a means for verifying, at a service of the resource management system that being operated by a party, the first information that asserts the identity of the device and the second information that asserts the identity of the user of the device. The resource management component 1020 may be configured as or otherwise support a means for registering, at the service of the resource management system, based on verifying the first information that asserts the identity of the device and the second information that asserts the identity of the user of the device, the public key of the device to a combination of the device and the user.

Figure 11:
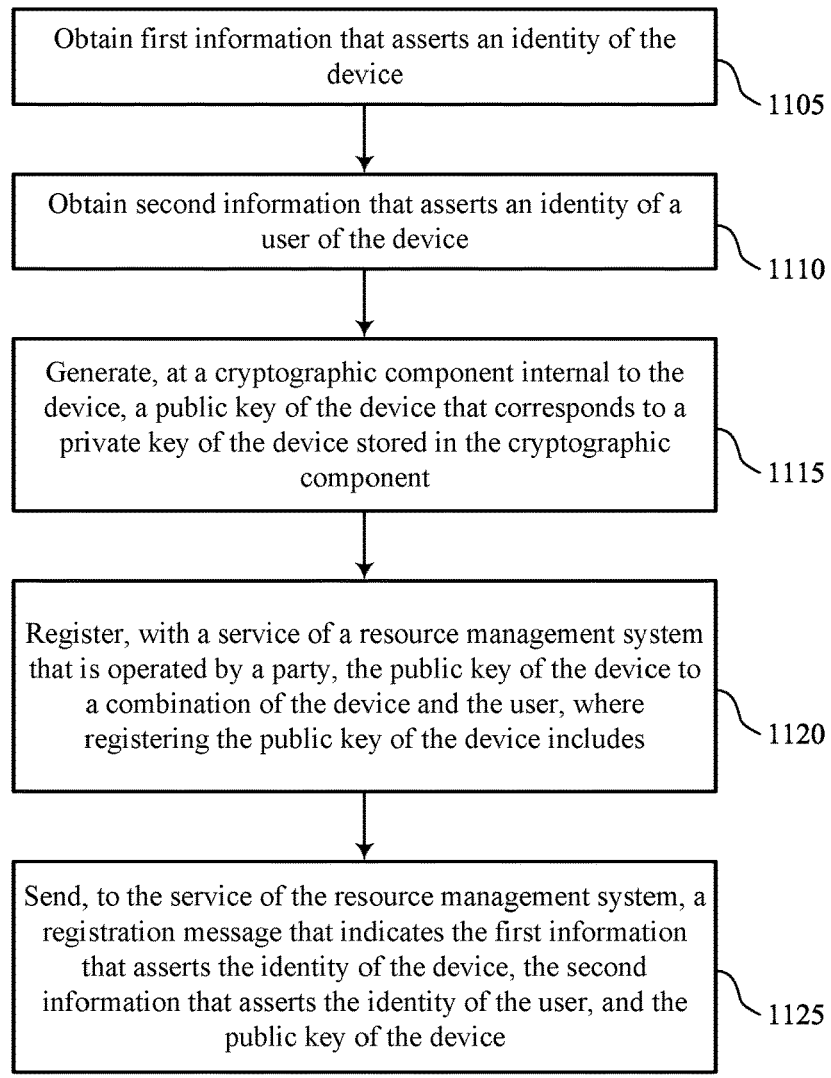
FIGS. 11 and 12 show examples of sets of operations for registering and utilizing a device user key in accordance with examples disclosed herein.

FIG. 11 shows an example of a set of operations for registering and utilizing a device user key in accordance with examples disclosed herein.

The method 1100 (and its operations) may be implemented by a device or its components as described herein. For example, the operations of the method 1100 may be performed by a device (e.g., one or more of the devices 113 of FIG. 1) as described with reference to FIGS. 1 through 7. In some examples, a device may execute a set of instructions to control the functional elements of the device to perform the described functions. Additionally, or alternatively, the device may perform aspects of the described functions using special-purpose hardware.

At 1105, the method may include obtaining first information that asserts an identity of the device. The operations of 1105 may be performed in accordance with examples as disclosed herein. In some examples, aspects of the operations of 1105 may be performed by a user identity component 625 as described with reference to FIG. 6.

At 1110, the method may include obtaining second information that asserts an identity of a user of the device. The operations of 1110 may be performed in accordance with examples as disclosed herein. In some examples, aspects of the operations of 1110 may be performed by a device identity component 630 as described with reference to FIG. 6.

At 1115, the method may include generating, at a cryptographic component internal to the device, a public key of the device that corresponds to a private key of the device stored in the cryptographic component. The operations of 1115 may be performed in accordance with examples as disclosed herein. In some examples, aspects of the operations of 1115 may be performed by a cryptographic component 635 as described with reference to FIG. 6.

At 1120, the method may include registering, with a service of a resource management system that is operated by a party, the public key of the device to a combination of the device and the user, where registering the public key of the device includes. The operations of 1120 may be performed in accordance with examples as disclosed herein. In some examples, aspects of the operations of 1120 may be performed by a registration component 640 as described with reference to FIG. 6.

At 1125, the method may include sending, to the service of the resource management system, a registration message that indicates the first information that asserts the identity of the device, the second information that asserts the identity of the user, and the public key of the device. The operations of 1125 may be performed in accordance with examples as disclosed herein. In some examples, aspects of the operations of 1125 may be performed by a registration component 640 as described with reference to FIG. 6.

Figure 12:
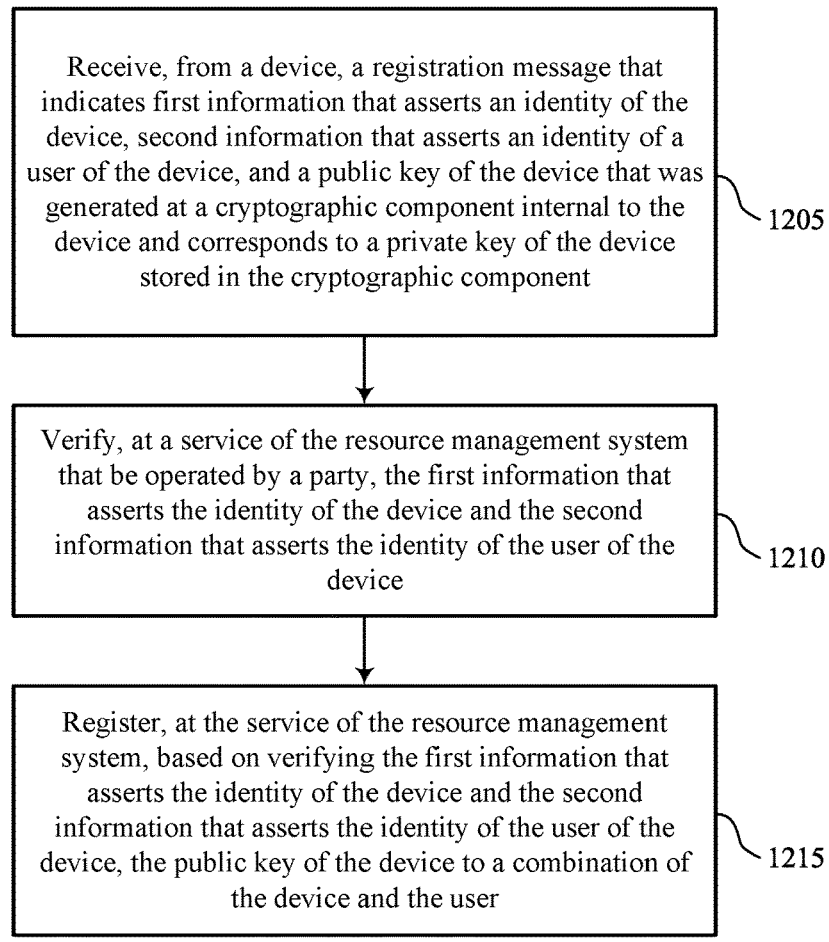

FIG. 12 shows an example of a set of operations for registering and utilizing a device user key in accordance with examples disclosed herein.

The method 1200 (and its operations) may be implemented by a system or its components as described herein. For example, the operations of the method 1200 may be performed by system (e.g., the RMS 101 of FIG. 1) as described with reference to FIGS. 1 through 4 and 8 through 10. In some examples, the system may execute a set of instructions to control the functional elements of the system to perform the described functions. Additionally, or alternatively, the system may perform aspects of the described functions using special-purpose hardware.

At 1205, the method may include receiving, from a device, a registration message that indicates first information that asserts an identity of the device, second information that asserts an identity of a user of the device, and a public key of the device that was generated at a cryptographic component internal to the device and corresponds to a private key of the device stored in the cryptographic component. The operations of 1205 may be performed in accordance with examples as disclosed herein. In some examples, aspects of the operations of 1205 may be performed by a registration component 925 as described with reference to FIG. 9.

At 1210, the method may include verifying, at a service of the resource management system that is operated by a party, the first information that asserts the identity of the device and the second information that asserts the identity of the user of the device. The operations of 1210 may be performed in accordance with examples as disclosed herein. In some examples, aspects of the operations of 1210 may be performed by a registration component 925 as described with reference to FIG. 9.

At 1215, the method may include registering, at the service of the resource management system, based on verifying the first information that asserts the identity of the device and the second information that asserts the identity of the user of the device, the public key of the device to a combination of the device and the user. The operations of 1215 may be performed in accordance with examples as disclosed herein. In some examples, aspects of the operations of 1215 may be performed by a registration component 925 as described with reference to FIG. 9.

The following provides an overview of aspects of the present disclosure:

Aspect 1: A method at a device (113), comprising: obtaining first information that asserts an identity of the device; obtaining second information that asserts an identity of a user of the device; generating, at a cryptographic component (219) internal to the device, a public key of the device that corresponds to a private key of the device stored in the cryptographic component; and registering, with a service (215) of a resource management system (101) that is operated by a party, the public key of the device to a combination of the device and the user, wherein registering the public key of the device comprises: sending, to the service of the resource management system, a registration message that indicates the first information that asserts the identity of the device, the second information that asserts the identity of the user, and the public key of the device.

Aspect 2: The method of aspect 1, further comprising: generating, after the public key of the device is generated, the registration message, wherein a payload of the registration message comprises the public key of the device and the second information that asserts the identity of the user; and signing, after the registration message is generated, the payload of the registration message with the first information that asserts the identity of the device.

Aspect 3: The method of any of aspects 1 through 2, further comprising: receiving, based on the public key of the device being registered to the combination of the device and the user at the service of the resource management system, a refresh token.

Aspect 4: The method of aspect 3, wherein the refresh token comprises a timestamp indicating when the refresh token was issued, an identifier of the refresh token, an indication of authentication measures used to obtain the refresh token, or any combination thereof.

Aspect 5: The method of any of aspects 3 through 4, further comprising: requesting, after the refresh token is received, access to resources (104) of a second party; sending, based on the access to the resources of the second party being requested, the refresh token to the service of the resource management system; and receiving, in response to the refresh token, a session token associated with accessing the resources of the second party.

Aspect 6: The method of aspect 5, further comprising: generating an access request that comprises the refresh token; signing the access request with the private key of the device to obtain a signed access request; and sending, after the access request is signed, the signed access request to the service of the resource management system, wherein the refresh token is sent to the service of the resource management system based on sending the signed access request to the service of the resource management system.

Aspect 7: The method of aspect 6, further comprising: generating, based on access to the resources of the second party being requested, a string of random characters; and generating a hash of the string of random characters, wherein the string of random characters is included in the access request as a challenge as part of the access request being generated.

Aspect 8: The method of aspect 7, further comprising: sending, after receiving the session token, the session token and the string of random characters to a second service (217) of the resource management system, wherein the session token comprises the hash of the string of random characters.

Aspect 9: The method of any of aspects 5 through 8, further comprising: receiving, in response to sending the refresh token as part of requesting the session token, a second refresh token with the session token, wherein the refresh token is invalidated based on the second refresh token being issued.

Aspect 10: The method of any of aspects 5 through 9, further comprising: accessing, based on the session token being received and validated by a second service (217) of the resource management system, the resources of the second party.

Aspect 11: The method of any of aspects 5 through 10, wherein the session token is signed by a private key of the service of the resource management system.

Aspect 12: The method of any of aspects 1 through 11, wherein the first information that asserts the identity of the device comprises a mobile device management certificate, a certificate obtained as a result of a procedure for enrolling the device with a second service (216) of the resource management system, or both.

Aspect 13: The method of any of aspects 1 through 12, wherein the second information that asserts the identity of the user comprises an identity token obtained for the user.

Aspect 14: The method of any of aspects 1 through 13, further comprising: enrolling, by an agent of the device, the device with a second service (216) of the resource management system; receiving, based on enrolling the device with the second service, a certificate that uniquely identifies the device, wherein the first information that asserts the identity of the device comprises the certificate.

Aspect 15: The method of any of aspects 1 through 14, further comprising: receiving, from a second service (216) of the resource management system, a mobile device management file; setting configurations of the device in accordance with a mobile device management policy indicated in the mobile device management file; and receiving, based on setting the configurations, a mobile device management certificate that uniquely identifies the device, wherein the first information that asserts the identity of the device comprises the mobile device management certificate.

Aspect 16: The method of any of aspects 1 through 15, further comprising: sending a request from the user to verify the identity of the user; and receiving, from a third service (214) of the resource management system, an identity token that uniquely identifies the user, wherein the second information that asserts the identity of the user comprises the identity token.

Aspect 17: A method at a resource management system (101), comprising: receiving, from a device (113), a registration message that indicates first information that asserts an identity of the device, second information that asserts an identity of a user of the device, and a public key of the device that was generated at a cryptographic component (219) internal to the device and corresponds to a private key of the device stored in the cryptographic component; verifying, at a service (215) of the resource management system that is operated by a party, the first information that asserts the identity of the device and the second information that asserts the identity of the user of the device; and registering, at the service of the resource management system, based on verifying the first information that asserts the identity of the device and the second information that asserts the identity of the user of the device, the public key of the device to a combination of the device and the user.

Aspect 18: The method of aspect 17, further comprising: generating, based on registering the public key of the device to the combination of the device and the user, a refresh token; and sending, based on generating the refresh token, the refresh token to the device.

Aspect 19: The method of aspect 18, further comprising: generating a payload of the refresh token that comprises a timestamp indicating when the refresh token was issued, an identifier of the refresh token, an indication of authentication measures used to obtain the refresh token, or any combination thereof; and signing the payload of the refresh token by a secret or a private key of the service of the resource management system, wherein the refresh token is generated based on generating and signing the payload.

Aspect 20: The method of any of aspects 17 through 19, further comprising: receiving, from the device, an access request that comprises a refresh token previously sent to the device, wherein the access request is associated with the device requesting access to resources (104) of a second party; verifying, using the public key of the device, that the access request is signed by the private key of the device; and sending, based on verifying the access request, a session token to the device.

Aspect 21: The method of aspect 20, further comprising: generating, based on verifying the access request received from the device, a payload of the session token comprising a timestamp indicating when the session token was issued, an indication of authentication measures used to obtain the refresh token, a hash of a random string of characters obtained from the device in the access request, an issue of the session token, or any combination thereof; and signing the payload of the session token with a private key of the service of the resource management system.

Aspect 22: The method of any of aspects 17 through 21, further comprising: receiving, at a second service (217) of the resource management system, from the device, a session token previously sent to the device in response to an access request received from the device, wherein the access request is associated with the device requesting access to resources (104) of a second party; verifying, by the second service of the resource management system, a signature of the session token using a public key of the service of the resource management system, the session token being signed by a private key of the service of the resource management system that corresponds to the public key of the service of the resource management system; and sending, from the second service of the resource management system to the second party, based on verifying the signature of the session token, a message authorizing the device and the user of the device to access the resources of the second party.

Aspect 23: The method of aspect 22, further comprising: receiving, at the second service of the resource management system with the session token, a random string of characters used by the device to generate a first hash of the random string of characters, wherein the first hash of the random string of characters was included in the access request; generating, by the second service of the resource management system using the random string of characters, a second hash of the random string of characters; and verifying, by the second service of the resource management system, that a third hash received in the session token matches the second hash of the random string of characters, wherein the message authorizing the device is sent based on verifying that the third hash matches the second hash of the random string of characters.

Aspect 24: The method of any of aspects 17 through 23, further comprising: receiving, at a second service (216) of the resource management system from an agent of the resource management system that is installed on the device, a request to enroll the device with the second service of the resource management system; enrolling, at the second service of the resource management system in response to the request, the device in the second service of the resource management system; and issuing, by the second service of the resource management system, to the agent, a certificate that uniquely identifies the device, wherein the first information that asserts the identity of the device comprises the certificate.

Aspect 25: The method of any of aspects 17 through 24, further comprising: receiving, at a second service (214) of the resource management system from an agent of the resource management system that is installed on the device, a request to verify the identity of the user; verifying, by the second service of the resource management system in response to the request, the identity of the user; and issuing, by the second service of the resource management system, to the agent, a token that uniquely identifies the user, wherein the second information that asserts the identity of the user comprises the token.

Aspect 26: A device (113) comprising one or more memories storing processor-executable code, and one or more processors coupled with the one or more memories and individually or collectively operable to execute the code to cause the device (113) to perform a method of any of aspects 1 through 16.

Aspect 27: A device (113) comprising at least one means for performing a method of any of aspects 1 through 16.

Aspect 28: A non-transitory computer-readable medium storing code the code comprising instructions executable by a processor to perform a method of any of aspects 1 through 16.

Aspect 29: A resource management system (101) comprising one or more memories storing processor-executable code, and one or more processors coupled with the one or more memories and individually or collectively operable to execute the code to cause the resource management system (101) to perform a method of any of aspects 17 through 25.

Aspect 30: A resource management system (101) comprising at least one means for performing a method of any of aspects 17 through 25.

Aspect 31: A non-transitory computer-readable medium storing code the code comprising instructions executable by a processor to perform a method of any of aspects 17 through 25.

It should be noted that the methods described above describe possible implementations, and that the operations and the steps may be rearranged or otherwise modified and that other implementations are possible. Furthermore, aspects from two or more of the methods may be combined.

The description herein, provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C. Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method at a device, comprising:
    obtaining first information that asserts an identity of the device;
    obtaining second information that asserts an identity of a user of the device;
    generating, at a cryptographic component internal to the device, a public key of the device that corresponds to a private key of the device stored in the cryptographic component; and
    registering, with a service of a resource management system that is operated by a party, the public key of the device to a combination of the device and the user, wherein registering the public key of the device comprises:
    sending, to the service of the resource management system, a registration message that indicates the first information that asserts the identity of the device, the second information that asserts the identity of the user, and the public key of the device, the method further comprising:
        receiving, based on the public key of the device being registered to the combination of the device and the user at the service of the resource management system, a refresh token;
    requesting, after the refresh token is received, access to resources of a second party;
    sending, based on the access to the resources of the second party being requested, the refresh token to the service of the resource management system;
    receiving, in response to the refresh token, a session token associated with accessing the resources of the second party;
    generating an access request that comprises the refresh token;
    generating, based on access to the resources of the second party being requested, a string of random characters;
    generating a hash of the string of random characters, wherein the string of random characters is included in the access request as a challenge as part of the access request being generated;
    signing the access request with the private key of the device to obtain a signed access request;
    sending, after the access request is signed, the signed access request to the service of the resource management system, wherein the refresh token is sent to the service of the resource management system in association with sending the signed access request to the service of the resource management system.

2. The method of claim 1, further comprising:
    generating, after the public key of the device is generated, the registration message, wherein a payload of the registration message comprises the public key of the device and the second information that asserts the identity of the user; and
    signing, after the registration message is generated, the payload of the registration message with the first information that asserts the identity of the device.

3. The method of claim 1, wherein the refresh token comprises a timestamp indicating when the refresh token was issued, an identifier of the refresh token, an indication of authentication measures used to obtain the refresh token, or any combination thereof.

4. The method of claim 1, further comprising:
sending, after receiving the session token, the session token and the string of random characters to a second service of the resource management system, wherein the session token comprises the hash of the string of random characters.

5. The method of claim 1, further comprising:
receiving, in response to sending the refresh token as part of requesting the session token, a second refresh token with the session token, wherein the refresh token is invalidated based on the second refresh token being issued.

6. The method of claim 1, further comprising:
accessing, based on the session token being received and validated by a second service of the resource management system, the resources of the second party.

7. The method of claim 1, wherein the session token is signed by a private key of the service of the resource management system.

8. The method of claim 1, wherein the first information that asserts the identity of the device comprises a mobile device management certificate, a certificate obtained as a result of a procedure for enrolling the device with a second service of the resource management system, or both.

9. The method of claim 1, wherein the second information that asserts the identity of the user comprises an identity token obtained for the user.

10. The method of claim 1, further comprising:
enrolling, by an agent of the device, the device with a second service of the resource management system; and
receiving, based on enrolling the device with the second service, a certificate that uniquely identifies the device, wherein the first information that asserts the identity of the device comprises the certificate.

11. The method of claim 1, further comprising:
receiving, from a second service of the resource management system, a mobile device management file;
setting configurations of the device in accordance with a mobile device management policy indicated in the mobile device management file; and
receiving, based on setting the configurations, a mobile device management certificate that uniquely identifies the device, wherein the first information that asserts the identity of the device comprises the mobile device management certificate.

12. The method of claim 1, further comprising:
sending a request from the user to verify the identity of the user; and
receiving, from a third service of the resource management system, an identity token that uniquely identifies the user, wherein the second information that asserts the identity of the user comprises the identity token.

13. A method at a resource management system, comprising:
receiving, from a device, a registration message that indicates first information that asserts an identity of the device, second information that asserts an identity of a user of the device, and a public key of the device that was generated at a cryptographic component internal to the device and corresponds to a private key of the device stored in the cryptographic component;
verifying, at a service of the resource management system that is operated by a party, the first information that asserts the identity of the device and the second information that asserts the identity of the user of the device;
registering, at the service of the resource management system, based on verifying the first information that asserts the identity of the device and the second information that asserts the identity of the user of the device, the public key of the device to a combination of the device and the user;
receiving, at a second service of the resource management system, a random string of characters used by the device to generate a first hash of the random string of characters, wherein the first hash of the random string of characters is included in an access request received from the device;
generating, by the second service of the resource management system using the random string of characters, a second hash of the random string of characters;
verifying, by the second service of the resource management system, that a third hash received in a session token matches the second hash of the random string of characters; and
sending a message authorizing the device based on verifying that the third hash matches the second hash of the random string of characters.

14. The method of claim 13, further comprising:
generating, based on registering the public key of the device to the combination of the device and the user, a refresh token; and
sending, based on generating the refresh token, the refresh token to the device.

15. The method of claim 14, wherein generating the refresh token comprises:
generating a payload of the refresh token that comprises a timestamp indicating when the refresh token was issued, an identifier of the refresh token, an indication of authentication measures used to obtain the refresh token, or any combination thereof; and
signing the payload of the refresh token by a secret or a private key of the service of the resource management system, wherein the refresh token is generated based on generating and signing the payload.

16. The method of claim 13, further comprising:
receiving, from the device, the access request that comprises a refresh token previously sent to the device, wherein the access request is associated with the device requesting access to resources of a second party;
verifying, using the public key of the device, that the access request is signed by the private key of the device; and
sending, based on verifying the access request, the session token to the device.

17. The method of claim 16, further comprising:
generating, based on verifying the access request received from the device, a payload of the session token comprising a timestamp indicating when the session token was issued, an indication of authentication measures used to obtain the refresh token, a hash of a random string of characters obtained from the device in the access request, an issue of the session token, or any combination thereof; and
signing the payload of the session token with a private key of the service of the resource management system.

18. The method of claim 13, further comprising:
receiving, at the second service of the resource management system, from the device, the session token previously sent to the device in response to the access request received from the device, wherein the access request is associated with the device requesting access to resources of a second party;

verifying, by the second service of the resource management system, a signature of the session token using a public key of the service of the resource management system, the session token being signed by a private key of the service of the resource management system that corresponds to the public key of the service of the resource management system; and sending, from the second service of the resource management system to the second party, based on verifying the signature of the session token, the message authorizing the device that further authorizes the user of the device to access the resources of the second party.

19. The method of claim 13, further comprising:

receiving, at the second service of the resource management system from an agent of the resource management system that is installed on the device, a request to enroll the device with the second service of the resource management system;

enrolling, at the second service of the resource management system in response to the request, the device in the second service of the resource management system; and issuing, by the second service of the resource management system, to the agent, a certificate that uniquely identifies the device, wherein the first information that asserts the identity of the device comprises the certificate.

20. The method of claim 13, further comprising:

receiving, at the second service of the resource management system from an agent of the resource management system that is installed on the device, a request to verify the identity of the user;

verifying, by the second service of the resource management system in response to the request, the identity of the user; and issuing, by the second service of the resource management system, to the agent, a token that uniquely identifies the user, wherein the second information that asserts the identity of the user comprises the token.

21. A resource management system, comprising:

one or more processors; and one or more memories storing code comprising instructions executable by the one or more processors, individually or collectively, to cause the resource management system to:

receive, from a device, a registration message that indicates first information that asserts an identity of the device, second information that asserts an identity of a user of the device, and a public key of the device that was generated at a cryptographic component internal to the device and corresponds to a private key of the device stored in the cryptographic component;

verify, at a service of the resource management system that is operated by a party, the first information that asserts the identity of the device and the second information that asserts the identity of the user of the device;

register, at the service of the resource management system, based on verifying the first information that asserts the identity of the device and the second information that asserts the identity of the user of the device, the public key of the device to a combination of the device and the user;

receive, at a second service of the resource management system, a random string of characters used by the device to generate a first hash of the random string of characters, wherein the first hash of the random string of characters is included in an access request received from the device;

generate, by the second service of the resource management system using the random string of characters, a second hash of the random string of characters;

verify, by the second service of the resource management system, that a third hash received in a session token matches the second hash of the random string of characters; and send a message authorizing the device based on verifying that the third hash matches the second hash of the random string of characters.

\* \* \* \* \*